US012183363B2

(12) United States Patent
Jansson et al.

(10) Patent No.: US 12,183,363 B2
(45) Date of Patent: *Dec. 31, 2024

(54) SINGING VOICE SEPARATION WITH DEEP U-NET CONVOLUTIONAL NETWORKS

(71) Applicant: Spotify AB, Stockholm (SE)

(72) Inventors: Andreas Simon Thore Jansson, New York, NY (US); Angus William Sackfield, Brooklyn, NY (US); Ching Chuan Sung, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,289

(22) Filed: Nov. 20, 2023

(65) Prior Publication Data

US 2024/0161770 A1 May 16, 2024

Related U.S. Application Data

(63) Continuation of application No. 17/135,127, filed on Dec. 28, 2020, now Pat. No. 11,862,191, which is a
(Continued)

(51) Int. Cl.
*G06F 15/00* (2006.01)
*G06N 3/08* (2023.01)
(Continued)

(52) U.S. Cl.
CPC ............... *G10L 25/81* (2013.01); *G06N 3/08* (2013.01); *G06N 5/046* (2013.01); *G10L 15/16* (2013.01); *G10L 21/10* (2013.01)

(58) Field of Classification Search
CPC .. G10H 1/0008; G10H 2250/035; G10H 1/46; G10H 2250/311; G10H 2220/005;
(Continued)

(56) References Cited

U.S. PATENT DOCUMENTS 9,300,268 B2 3/2016 Chen et al.
9,389,828 B1 7/2016 Zelenov et al.
(Continued)

FOREIGN PATENT DOCUMENTS

EP 3620986 3/2020
GB 2506404 4/2014
(Continued)

OTHER PUBLICATIONS

Badrinarayan et al., "Segnet: A deep convolutional encoder-decoder architecture for scene segmentation," IEEE Transactions on Pattern Analysis and Machine Intelligence, (2016).
(Continued)

*Primary Examiner* — Michael Ortiz-Sanchez
(74) *Attorney, Agent, or Firm* — McDonnell Boehnen Hulbert & Berghoff LLP

(57) ABSTRACT

A system, method and computer product for training a neural network system. The method comprises applying an audio signal to the neural network system, the audio signal including a vocal component and a non-vocal component. The method also comprises comparing an output of the neural network system to a target signal, and adjusting at least one parameter of the neural network system to reduce a result of the comparing, for training the neural network system to estimate one of the vocal component and the non-vocal component. In one example embodiment, the system comprises a U-Net architecture. After training, the system can estimate vocal or instrumental components of an audio signal, depending on which type of component the system is trained to estimate.

20 Claims, 12 Drawing Sheets

Related U.S. Application Data continuation of application No. 16/242,525, filed on Jan. 8, 2019, now Pat. No. 10,923,142, which is a continuation of application No. 16/055,870, filed on Aug. 6, 2018, now Pat. No. 10,923,141.

(51) Int. Cl.
| | |
|---|---|
| *G06N 5/046* | (2023.01) |
| *G10L 15/16* | (2006.01) |
| *G10L 21/10* | (2013.01) |
| *G10L 25/00* | (2013.01) |
| *G10L 25/81* | (2013.01) |

(58) Field of Classification Search
CPC ... G10L 21/0316; G10L 21/003; G10L 21/00; G10L 21/0364; G10L 21/034; G10L 21/0272; G10L 21/10; G10L 15/16; G10L 15/20; G10L 25/81; G06N 3/08; G06N 3/02; G06N 3/045; G06N 3/044; G06F 3/165

See application file for complete search history.

(56) References Cited

U.S. PATENT DOCUMENTS

| | | | |
|---|---|---|---|
| 10,140,083 | B1 | 11/2018 | Nguyen |
| 10,242,665 | B1 | 3/2019 | Abeloe |
| 10,511,908 | B1 | 12/2019 | Fisher |
| 10,522,167 | B1 | 12/2019 | Ayrapetian |
| 10,839,826 | B2 | 11/2020 | Humphrey |
| 10,923,141 | B2 | 2/2021 | Jansson |
| 10,923,142 | B2 | 2/2021 | Jansson |
| 10,977,555 | B2 | 4/2021 | Jansson |
| 10,991,385 | B2 | 4/2021 | Jansson |
| 11,568,256 | B2 | 1/2023 | Sanchez |
| 2013/0064379 | A1 | 3/2013 | Pardo et al. |
| 2013/0322634 | A1 | 12/2013 | Bennett et al. |
| 2015/0110294 | A1 | 4/2015 | Chen et al. |
| 2015/0278686 | A1 | 10/2015 | Cardinaux |
| 2016/0034810 | A1 | 2/2016 | Hershey et al. |
| 2016/0036962 | A1 | 2/2016 | Rand |
| 2016/0054976 | A1 | 2/2016 | Seok et al. |
| 2016/0139775 | A1 | 5/2016 | Segal |
| 2017/0060520 | A1 | 3/2017 | Cohen et al. |
| 2017/0097803 | A1* | 4/2017 | Herlöfsson ............. G06F 3/165 |
| 2018/0122403 | A1 | 5/2018 | Koretzky et al. |
| 2018/0217717 | A1 | 8/2018 | Yasuda et al. |
| 2018/0329461 | A1 | 11/2018 | Hernandez Santisteban et al. |
| 2018/0330707 | A1 | 11/2018 | Zhu et al. |
| 2018/0366097 | A1 | 12/2018 | Sharp |
| 2019/0005684 | A1 | 1/2019 | De Fauw et al. |
| 2019/0005934 | A1 | 1/2019 | Deif |
| 2019/0036502 | A1 | 1/2019 | Vadim et al. |
| 2019/0043528 | A1 | 2/2019 | Humphrey |
| 2019/0171936 | A1 | 6/2019 | Karras |
| 2019/0304480 | A1 | 10/2019 | Narayanan |
| 2019/0341010 | A1 | 11/2019 | Wipperfurth |
| 2019/0370554 | A1 | 12/2019 | Meier |
| 2019/0391716 | A1 | 12/2019 | Badr et al. |
| 2020/0133620 | A1* | 4/2020 | Boumi ................... G06F 3/165 |
| 2021/0256994 | A1 | 8/2021 | Jansson |
| 2021/0256995 | A1 | 8/2021 | Jansson |
| 2021/0279588 | A1 | 9/2021 | Sanchez |
| 2023/0125789 | A1 | 4/2023 | Jansson |

FOREIGN PATENT DOCUMENTS

| | | |
|---|---|---|
| WO | 2017/098743 | 6/2017 |
| WO | 2018/001039 | 1/2018 |

OTHER PUBLICATIONS

Bansal et al., "Pixelnet: Towards a general pixel-level architecture", arXiv preprint arXiv:1609.06694, (2016).

Berenzweig et al., "Locating singing voice segments within music signals," In Int'l Conference on Acoustics, Speech and Signal Processing (ICASSP), pp. 119-122, IEEE, 2001.

Bittner et al. "MedleyDB: A multitrack dataset for annotation-intensive MIR research" Proceedings of the 15th Int'l Soc'y for Music Info. Retrieval Conf., ISMIR 2014, Taipei, Taiwan, Oct. 27-31, 2014, pp. 155-160 (2014).

Brown, "Karaoke Idols: Popular Music and the Performance of Identity", Intellect Books, pp. 37-38, (2015).

Brown, J., "Calculation of a constant q spectral transform," The Journal of the Acoustical Society of America, 89 (1):425-434, 1991.

Carterette, "Incremental test collections," In Proceedings of the 14th ACM Int'l Conference on Information and Knowledge Management, pp. 680-687, ACM, 2005.

Chan et al., "Vocal activity informed singing voice separation with the iKala dataset", Acoustics, Speech and Signal Processing (ICASSP), 2015 IEEE Int'l Conf. on, pp. 718-722, IEEE (2015).

Chandra et al. "Monoaural audio source separation using deep convolutional neural networks." Int'l Conf. on Latent Variable Analysis and Signal Separation, pp. 258-266. Springer (2017).

Cohen-Hadria, Alice et al., "Improving Singing Voice Separation using Deep U-Net and Wave-U-Net with Data Augmentation", ARXIV.org, Cornell Univ. Library, 201 Olin Library, Mar. 4, 2019, 5 pages.

Deng et al., "ImageNet: A large-scale hierarchical image database," In Computer Vision and Pattern Recognition (CVPR), IEEE Conference on, pp. 248-255, IEEE, 2009.

Dobashi, Ayaka et al., "A music performance assistance system based on vocal, harmonic, and percussive source separation and content vizualization for music audio signals", Proceedings of SMC (2015): 99-104.

Ellis et al, "Echoprint: An open music identification service", Proceedings of the 12th Int'l Soc'y for Music Info. Retrieval Conf. (ISMIR), (2011) (2 sheets).

Emiya et al., "Subjective and objective quality assessment of audio source separation,", IEEE Transactions on Audio, Speech, and Language Processing, 19(7):2046-2057, (2011).

European Communication in Application 19188423.8, mailed Mar. 29, 2021, 7 pages.

European Communication in Application 19188427.9, mailed Dec. 3, 2021, 7 pages.

European Communication in Application 19188427.9, mailed Aug. 4, 2021, 7 pages.

European Extended Search Report in Application 22206166.5, mailed Feb. 22, 2023, 17 pages.

Extended European Search Report from related European Appln. No. 19188423.8, dated Jan. 2, 2020.

Extended European Search Report from related European Appln. No. 19188427.9, dated Jan. 2, 2020.

Goodfellow et al., "Deep learning", vol. 1. Cambridge: MIT press (2016), Chapter 9: Convolutional Neural Networks.

Grais et al., "Single channel audio source separation using convolutional denoising autoencoders", arXiv preprint arXiv:1703.08019 (2017).

Griffin et al., "Signal estimation from modified short-time Fourier transform", IEEE Transactions on Acoustics, Speech, and Signal Processing, 32.2:236-243 (1984).

Hamel et al., "Temporal pooling and multiscale learning for automatic annotation and ranking of music audio," In Proceedings of the 12th Int'l Society for Music Information Retrieval Conference (ISMIR), pp. 729-734, 2011.

Huang et al., "Singing-voice separation from monaural recordings using deep recurrent neural networks", Proceedings of the 15th Int'l Soc'y for Music Info. Retrieval Conf., IS-MIR 2014, Taipei, Taiwan, Oct. 27-31, 2014, pp. 477-482 (2014).

Huang, P. et al., "Joint Optimization of Masks and Deep Recurrent Neural Networks for Monaural Source Separation," in IEEE/ACM Transactions on Audio, Speech, and Language Processing, vol. 23, No. 12, pp. 2136-2147, Dec. 2015.

Humphrey et al., "Mining labeled data from web-scale collections for vocal activity detection in music", Proceedings of the 18th ISMIR Conf. (2017).

(56) References Cited

OTHER PUBLICATIONS

Humphrey, E. et al., "Rethinking automatic chord recognition with convolutional neural networks," In Int'l Conference on Machine Learning and Applications (ICMLA), vol. 2, pp. 357-632. IEEE, 2012.
Ikemiya et al., "Singing voice analysis and editing based on mutually dependent F0 estimation and source separation", Proc. IEEE Int. Conf. Acoust. Speech Signal Process, pp. 574-578 (Apr. 2015).
Isola et al. "Image-to-image translation with conditional adversarial networks." arXiv preprint arXiv:1611.07004 (2016).
Jannson et al., "Singing Voice Separation With Deep U-Net Convolutional Networks", 18th Int'l Society for Music Info. Retrieval Conf. Suzhou, China (2017).
Kingma et al., "A method for stochastic optimization", arXiv preprint arXiv:1412.6980 (2014).
Leglaive et al., "Singing voice detection with deep recurrent neural networks," In International Conference on Acoustics, Speech and Signal Processing (ICASSP), pp. 121-125, IEEE, 2015.
Likert, "A technique for the measurement of attitudes", Archives of psychology (1932).
Long et al. "Fully convolutional networks for semantic segmentation." Proceedings of the IEEE Conf. on Computer Vision and Pattern Recognition, pp. 3431-3440 (2015).
Luo et al. "Deep clustering for singing voice separation", (2010). http://creativecommons.org/licenses/by-nc-sa/3.0/.
Luo et al., "Deep clustering and conventional networks for music separation: Stronger together", arXiv preprint arXiv:1611.06265 (2016).
Mauch et al., "Timbre and melody features for the recognition of vocal activity and instrumental solos in polyphonic music," In Proceedings of the 12th Int'l Society for Music Information Retrieval Conference (ISMIR), pp. 233-238, 2011.
Mauch, et al., "pYIN: A fundamental frequency estimator using probabilistic threshold distributions," In Int'l Conference on Acoustics, Speech and Signal Processing (ICASSP), pp. 659-663. IEEE, 2014.
Mesaros et al., "Automatic recognition of lyrics in singing," EURASIP Journal on Audio, Speech, and Music Processing, 2010(1):546047 (2010).
Mesaros et al., "Singer identification in polyphonic music using vocal separation and pattern recognition methods", Proceedings of the 8th Int'l Conf. on Music Info. Retrieval, ISMIR 2007, Vienna, Austria, Sep. 23-27, 2007, pp. 375-378, (2007).
Mimilakis et al., "A recurrent encoder-decoder approach with skip-filtering connections for monaural singing voice separation", 2017, IEEE 27th International Workshop on Machine Learning for Signal Processing (MLSP), Tokyo, 2017, pp. 1-6.
Noh et al., "Learning deconvolution network for semantic segmentation", Proceedings of the IEEE Int'l Conf. on Computer Vision, pp. 1520-1528 (2015).
Oh, Jaehoon et al., "Spectrogram-channels u-net: a source separation model viewing each channel as the spectrogram of each source", ARXIV.org Cornell Univ. Library, 201 Olin Library, Oct. 26, 2018, 5 pages.
Orio et al., "Music retrieval: A tutorial and review", Foundations and Trends R in Info. Retrieval, 1(1):1-90 (2006).
Ozerov et al., "Adaptation of bayesian models for single-channel source separation and its application to voice/music separation in popular songs", IEEE Transactions on Audio, Speech, and Language Processing, 15(5):1564-1578 (2007).
Park et al., "Music Source Separation using Stacked Hourglass Networks," arxiv.org, Cornell University Library, 201 Olin Library Cornell University Ithaca, NY 14853 (2018).
Raffel et al., "A transparent implementation of common MIR metrics", Proceedings of the 15th Int'l Soc'y for Music Info. Retrieval Conf., ISMIR 2014, Taipei, Taiwan, Oct. 27-31, 2014, pp. 367-372 (2014).
Raffel et al., "Large-scale content-based matching of MIDI and audio files," In Proceedings of the 16th Int'l Society for Music Information Retrieval Conference (ISMIR). ISMIR, 2015.
Rafii et al., "Repeating pattern extraction technique (Repet): A simple method for music/voice separation", IEEE transactions on audio, speech, and language processing, 21(1):73-84 (2013).
Rafii, Z. et al., "A simple music/voice separation method based on the extraction of the repeating musical structure", 2011 IEEE International Conference on Acoustics, Speech and Signal Processing (ICASSP), Prague, Czech Republic, 2-11, pp. 221-224, doi: 10.1109/ICASSP.2011.5946380 (2011).
Ramona et al., "Vocal detection in music with support vector machines", In Int'l Conference on Acoustics, Speech and Signal Processing (ICASSP), pp. 1885-1888. IEEE, 2008.
Regnier et al., "Singing voice detection in music tracks using direct voice vibrato detection", In Int'l Conference on Acoustics, Speech and Signal Processing (ICASSP), pp. 1685-1688. IEEE, 2009.
Ronneberger et al., "U-net: Convolutional networks for biomedical image segmentation", Int'l Conf. on Medical Image Computing and Computer-Assisted Intervention, pp. 234-241. Springer (2015).
Rosenblatt, "The perceptron: A probabilistic model for information storage and organization in the brain", Psychological Review, vol. 65, No. 6, pp. 386-408 (1958).
Schluter, J., "Learning to pinpoint singing voice from weakly labeled examples", In Proceedings of the 17th Int'l Society for Music Information Retrieval Conference (ISMIR), 2016.
Schulter et al., "Musical onset detection with convolutional neural networks", 6th Int'l Workshop on Machine Learning and Music (MML), Prague, Czech Republic (2013).
Simpson et al. "Deep karaoke: Extracting vocals from musical mixtures using a convolutional deep neural network." Int'l Conf. on Latent Variable Analysis and Signal Separation, pp. 429-436. Springer (2015).
Smaragdis et al., "Static and dynamic source separation using nonnegative factorizations: A unified view", IEEE Signal Processing Magazine, 31(3):66-75 (2014).
Stoller, D. et al., Wave-U-Net: A Multi-Scale Neural Network for End-to-End Audio Source Separation, ISMIR2018 Daniel Stoller Sebastian Ewert Simon Dixon (Year: 2018).
Tagg "Analysing popular music: theory, method and practice." Popular music, 2:37-67 (1982).
Thiede et al., "PEAQ—The ITU standard for objective measurement of perceived audio quality", Journal of the Audio Eng'g Soc'y, 48(112):3-29 (2000).
Tzanetakis et al., "Musical genre classification of audio signals", IEEE Transactions on speech and audio processing, 10(5):293-302 (2002).
US related U.S. Appl. No. 16/055,870, filed Aug. 6, 2018, entitled "Singing Voice Separation With Deep U-Net Convolutional Networks".
US related U.S. Appl. No. 16/165,498, filed Oct. 19, 2019, entitled "Singing Voice Separation With Deep U-Net Convolutional Networks".
US related U.S. Appl. No. 16/242,525, filed Jan. 8, 2019, entitled "Singing Voice Separation With Deep U-Net Convolutional Networks".
US related U.S. Appl. No. 16/521,756, filed Jul. 25, 2019, entitled "Automatic Isolation of Multiple Instruments From Musical Mixtures".
Vembu et al., "Separation of vocals from polyphonic audio recordings", ISMIR 2005, 6th Int'l Conf. on Music Info. Retrieval, London, UK, Sep. 11-15, 2005, Proceedings, pp. 337-344 (2005).
Vincent et al., "Performance measurement in blind audio source separation", IEEE transactions on audio, speech, and language processing, 14(4):1462-1469 (2006).
Virtanen, "Monaural sound source separation by nonnegative matrix factorization with temporal continuity and sparseness criteria", IEEE transactions on audio, speech, and language processing, 15(3):1066-1074 (2007).
Zhang et al., "Colorful image colorization", European Conf. on Computer Vision, pp. 649-666. Springer (2016).

(56) References Cited

OTHER PUBLICATIONS

Zhang et al., "Weakly Supervised Audio Source Separation via Spectrum Energy Preserved Wasserstein Learning", arxiv.org, Cornell University Library, 201 Olin Library Cornell University Ithaca, NY 14853 (2017).
Zhao et al., "The Sound of Pixels", arxiv.org, Cornell University Library, 201 Olin Library Cornell University Ithaca, NY 14853 (2018).
Zhao, et al., "The Sound of Pixels", In Proc. ECCV (2018).
Zwillinger, D. and Kokoska, S. (eds.), "Probability and Statistics Tables and Formulae", Chapman & Hall, New York, NY, 2000.

* cited by examiner

| | Title | Artist | Duration | Type |
|---|---|---|---|---|
| | 100 | 102 | 104 | 106 |
| Track 1 | Title 1 | Artist 1 | Duration 1 | Original |
| Track 2 | Title 2 | Artist 2 | Duration 2 | Instrumental |
| Track 3 | Title 3 | Artist 3 | Duration 3 | Instrumental |
| ⋮ | ⋮ | ⋮ | ⋮ | ⋮ |
| Track-n | Title-n | Artist-n | Duration-n | Original |

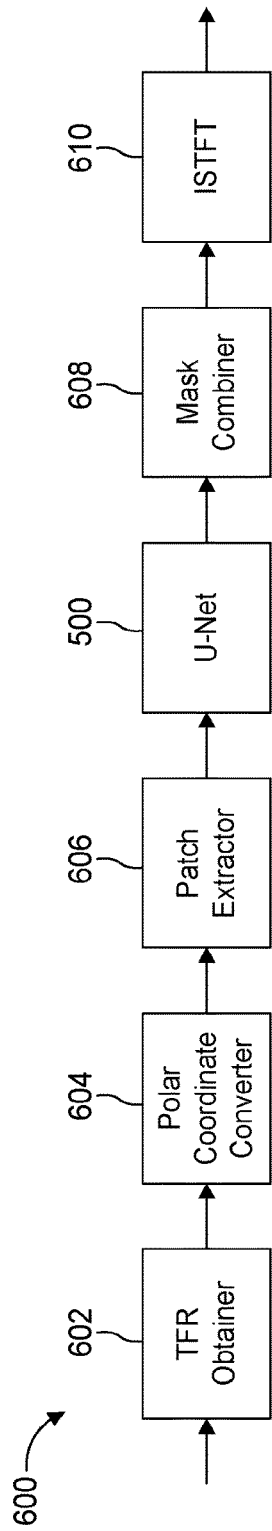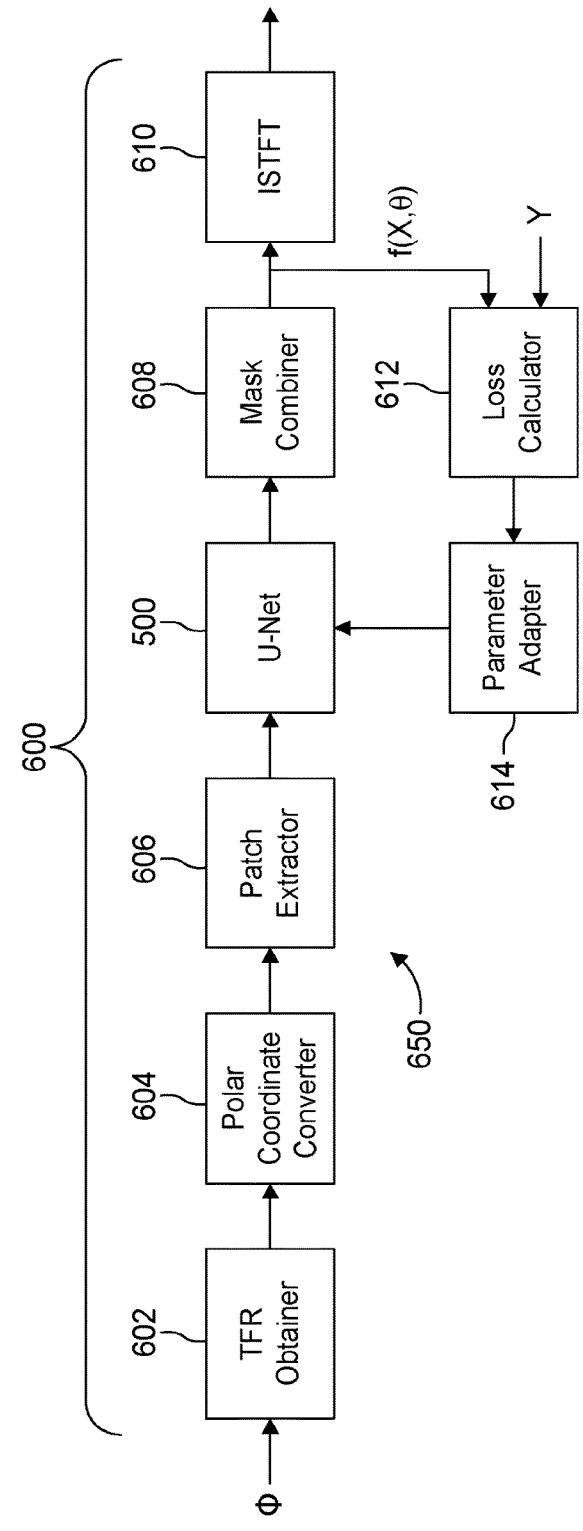

Extracting Voice

Reference

△ ▭━━━▭ 0:10 🔊

Rate how well the vocals are isolated in the examples below relative to the full mix above.

Examples

Ratings

△ ▭━━━▭ 0:10 🔊

Poor, can hear instruments clearly.    1 2 3 4 5 6 7    Perfect, only vocals remain.
○ ○ ○ ○ ○ ○ ○

△ ▭━━━▭ 0:10 🔊

Poor, can hear instruments clearly.    1 2 3 4 5 6 7    Perfect, only vocals remain.
○ ○ ○ ○ ○ ○ ○

△ ▭━━━▭ 0:10 🔊

Poor, can hear instruments clearly.    1 2 3 4 5 6 7    Perfect, only vocals remain.
○ ○ ○ ○ ○ ○ ○

FIG. 12

SINGING VOICE SEPARATION WITH DEEP U-NET CONVOLUTIONAL NETWORKS

CROSS-REFERENCE TO RELATED APPLICATION

This application claims priority to and is a continuation of U.S. application Ser. No. 17/135,127, filed Dec. 28, 2020, which is a continuation of U.S. application Ser. No. 16/242,525, filed Jan. 8, 2019, now U.S. Pat. No. 10,923,142, issued Feb. 26, 2021, which is a continuation U.S. application Ser. No. 16/055,870, filed Aug. 6, 2018, now U.S. Pat. No. 10,923,141, issued Feb. 16, 2021, which application are incorporated by reference herein in their entireties.

BACKGROUND

A number of publications, identified as References [1] to [39], are listed in a section entitled "REFERENCES" located at the end of the DETAILED DESCRIPTION herein. Those References will be referred to throughout this application.

The field of Music Information Retrieval (MIR) concerns itself, among other things, with the analysis of music in its many facets, such as melody, timbre or rhythm (see, e.g., publication [20]). Among those aspects, popular western commercial music (i.e., "pop" music) is arguably characterized by emphasizing mainly the melody and accompaniment aspects of music. For purposes of simplicity, the melody, or main musical melodic line, also referred to herein as a "foreground", and the accompaniment also is referred to herein a "background" (see, e.g., Reference [27]). Typically, in pop music the melody is sung, whereas the accompaniment is performed by one or more instrumentalists. Often, a singer delivers the lyrics, and the backing musicians provide harmony as well as genre and style cues (see, e.g., Reference [29]).

The task of automatic singing voice separation consists of estimating what the sung melody and accompaniment would sound like in isolation. A clean vocal signal is helpful for other related MIR tasks, such as singer identification (see, e.g., Reference [18]) and lyric transcription (see, e.g., Reference [17]). As for commercial applications, it is evident that the karaoke industry, estimated to be worth billions of dollars globally (see, e.g., Reference [4]), would directly benefit from such technology.

Several techniques have been proposed for blind source separation of musical audio. Successful results have been achieved with non-negative matrix factorization (see. e.g., References [26, 30, 32]), Bayesian methods (see, e.g., Reference [21]), and the analysis of repeating structures (See, e.g., Reference [23]).

Deep learning models have recently emerged as powerful alternatives to traditional methods. Notable examples include Reference [25] where a deep feed-forward network learns to estimate an ideal binary spectrogram mask that represents the spectrogram bins in which the vocal is more prominent than the accompaniment. In Reference [9], the authors employ a deep recurrent architecture to predict soft masks that are multiplied with the original signal to obtain the desired isolated source.

Convolutional encoder-decoder architectures have been explored in the context of singing voice separation in References [6] and [8]. In both of these works, spectrograms are compressed through a bottleneck layer and re-expanded to the size of the target spectrogram. While this "hourglass" architecture is undoubtedly successful in discovering global patterns, it is unclear how much local detail is lost during contraction.

One potential weakness shared by the publications cited above is the lack of large training datasets. Existing models are usually trained on hundreds of tracks of lower-than-commercial quality, and may therefore suffer from poor generalization.

Over the last few years, considerable improvements have occurred in the family of machine learning algorithms known as image-to-image translation (see, e.g., Reference [11])—pixel-level classification (see, e.g., Reference [2]), automatic colorization (see, e.g., Reference [33]), and image segmentation (see. e.g., Reference [1])—largely driven by advances in the design of novel neural network architectures.

It is with respect to these and other general considerations that embodiments have been described. Also, although relatively specific problems have been discussed, it should be understood that the embodiments should not be limited to solving the specific problems identified in the background.

SUMMARY

The foregoing and other limitations are overcome by a system, method and computer product for training a neural network system. In one example embodiment herein, the method comprises applying an audio signal to the neural network system, the audio signal including a vocal component and a non-vocal component. The method also comprises comparing an output of the neural network system to a target signal, and adjusting at least one parameter of the neural network system to reduce a result of the comparing, for training the neural network system to estimate one of the vocal component and the non-vocal component. According to an example aspect herein, the neural network system includes a U-Net.

Also in one example embodiment herein, the audio signal and the target signal represent different versions of a same musical song, the audio signal includes mixed vocal and non-vocal (e.g., instrumental) content (i.e., the audio signal is therefore also referred to herein as a "mixed signal", or an "input (mixed) signal"), and the target signal includes either vocal content or non-vocal content. Also in one example embodiment herein, the non-vocal component is an instrumental component, and the target signal represents an instrumental signal or a vocal signal. According to another example embodiment herein, the method further comprises obtaining the target signal by removing an instrumental component from a signal that includes vocal and instrumental components.

Additionally, in still another example embodiment herein, the method further comprises identifying the audio signal and the target signal as a pair, wherein the identifying includes determining at least one of:
  that the audio signal and the target signal relate to a same artist,
  that a title associated with at least one of the audio signal and the target signal does not include predetermined information, and
  that durations of the audio signal and the target signal differ by no more than a predetermined length of time.

In one example embodiment herein, the method further comprises converting the audio signal to an image in the neural network system, and the U-Net comprises a convolution path for encoding the image, and a deconvolution path for decoding the image encoded by the convolution path.

The U-Net, in one example embodiment herein, additionally comprises concatenations between the paths (e.g., encoder and decoder paths). Moreover, in one example embodiment herein, the method further comprises applying an output of the deconvolution path as a mask to the image.

A system, method and computer product also are provided herein for estimating a component of a provided audio signal, according to an example aspect herein. The method comprises converting the provided audio signal to an image, and applying the image to a U-Net trained to estimate one of vocal content and instrumental content. The method of this aspect of the present application also comprises converting an output of the U-Net to an output audio signal. The output audio signal represents an estimate of either a vocal component of the provided audio signal or an instrumental component of the provided audio signal, depending on whether the U-Net is trained to estimate the vocal content or the instrumental content, respectively.

BRIEF DESCRIPTION OF THE DRAWINGS

FIG. 6a is a block diagram of a neural network system that includes the U-Net architecture 500 of FIG. 5, and which can perform the procedure of FIG. 4, according to an example embodiment herein.

FIG. 6b is a block diagram of a system 650 used to train for estimation of a vocal or instrumental component of an audio signal, according to an example embodiment herein.

FIG. 12 is a screen capture of a CrowdFlower question.

DETAILED DESCRIPTION

Figures 1, 2:
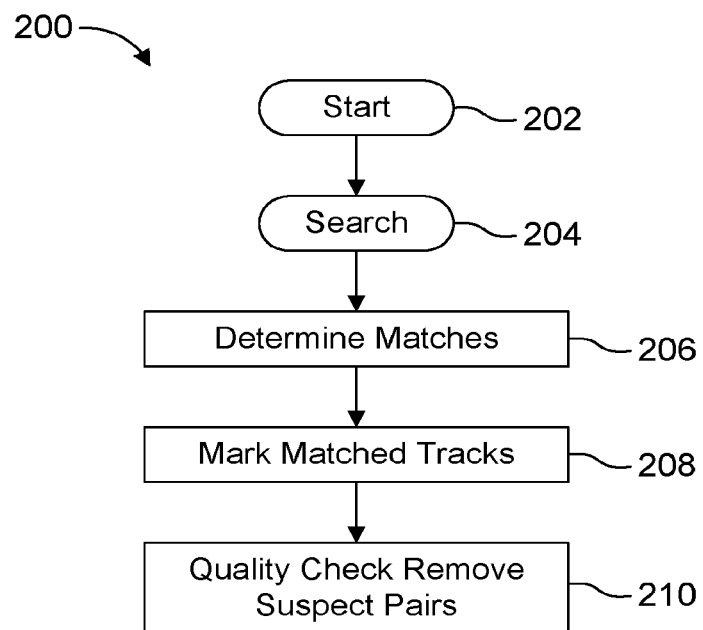
FIG. 1 shows an example of a table that can be employed to implement an example aspect herein, wherein the table includes metadata associated with tracks.
FIG. 2 is a flow diagram of a procedure for identifying matching tracks, according to an example aspect herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The example aspects described herein address a voice separation task, whose domain is often considered from a time-frequency perspective, as the translation of a mixed spectrogram into vocal and instrumental spectrograms. By using this framework, the technology exploits to advantage some advances in image-to-image translation—especially in regard to the reproduction of fine-grained details—for use in blind source separation for music.

The decomposition of a music audio signal into its vocal and backing track components is analogous to image-to-image translation, where a mixed spectrogram is transformed into its constituent sources. According to an example aspect herein, a U-Net architecture—initially developed for medical imaging—is employed for the task of source separation, given its proven capacity for recreating the fine, low-level detail required for high-quality audio reproduction. At least some example embodiments herein, through both quantitative evaluation and subjective assessment, demonstrate that they achieve state-of-the-art performance.

An example aspect described herein adapts a U-Net architecture to the task of vocal separation. That architecture was introduced originally in biomedical imaging, to improve precision and localization of microscopic images of neuronal structures. The architecture builds upon a fully convolutional network (see, e.g., Reference [14]) and, in one example, may be similar to the deconvolutional network (see, e.g., Reference [19]). In a deconvolutional network, a stack of convolutional layers—where each layer halves the size of an image but doubles the number of channels—encodes the image into a small and deep representation. That encoding is then decoded to the original size of the image by a stack of upsampling layers.

In the reproduction of a natural image, displacements by just one pixel are usually not perceived as major distortions. In the frequency domain, however, even a minor linear shift in a spectrogram may have significant effects on perception. This is particularly relevant in music signals, because of the logarithmic perception of frequency. Moreover, a shift in the time dimension can become audible as jitter and other artifacts. Therefore, it can be useful that a reproduction preserves a high level of detail. According to an example aspect herein, the U-Net architecture herein adds additional skip connections between layers at the same hierarchical level in the encoder and decoder. This enables low-level information to flow directly from the high-resolution input to the high-resolution output.

The neural network architecture described herein, according to one example embodiment, can predict vocal and instrumental components of an input signal indirectly. In one example embodiment herein, an output of a final decoder layer is a soft mask that is multiplied element-wise with a mixed spectrogram to obtain a final estimate. Also in one example embodiment herein, two separate models are trained for the extraction of instrumental and vocal components, respectively, of a signal, to allow for more divergent training schemes for the two models in the future. In one example embodiment herein, the neural network model operates exclusively on the magnitude of audio spectrograms. The audio signal for an individual (vocal/instrumental) component is rendered by constructing a spectrogram, wherein the output magnitude is given by applying a mask predicted by the U-Net to the magnitude of the original spectrum, while the output phase is that of the original spectrum, unaltered. Experimental results presented below indicate that such a simple methodology proves effective.

Dataset

According to an example aspect herein, the model architecture can employ training data available in the form of a triplet (original signal, vocal component, instrumental component). However, in the event that vast amounts of unmixed multi-track recordings are not available, an alternative strategy according to an example aspect herein can be employed to mine for matching or candidate pairs of tracks, to obtain training data. For example, it is not uncommon for artists to release instrumental versions of tracks along with the original mix. In accordance with one example aspect herein, pairs of (original, instrumental) tracks from a large commercial music database are retrieved. Candidates are found by examining associated metadata for tracks with, in one example embodiment, matching duration and artist information, where the track title (fuzzily) matches except for the string "Instrumental" occurring in exactly one title in the pair. The pool of tracks is pruned by excluding exact content matches. In one example, such procedures are performed according to the technique described in Reference [10], which is incorporated by reference herein in its entirety, as if set forth fully herein. The approach enables a large source of X (mixed) and $Y_i$ (instrumental) magnitude spectrogram pairs to be provided. A vocal magnitude spectrogram $Y_v$ is obtained from their half-wave rectified difference. In one example, a final dataset included approximately 20,000 track pairs, resulting in almost two months-worth of continuous audio, which is perhaps the largest training data set ever applied to musical source separation. Table A below shows a relative distribution of frequent genres in the dataset, obtained from catalog metadata.

TABLE A

Training data genre distribution

| Genre | Percentage |
| --- | --- |
| Pop | 26.0% |
| Rap | 21.3% |
| Dance & House | 14.2% |
| Electronica | 7.4% |
| R&B | 3.9% |
| Rock | 3.6% |
| Alternative | 3.1% |
| Children's | 2.5% |

TABLE A-continued

Training data genre distribution

| Genre | Percentage |
| --- | --- |
| Metal | 2.5% |
| Latin | 2.3% |
| Indie Rock | 2.2% |
| Other | 10.9% |

Selection of Matching Recordings

The manner in which candidate recording pairs are formed using a method according to an example embodiment herein will now be described, with reference to the flow diagram of FIG. 2. The method (procedure) 200 commences at step 202. According to one example embodiment herein, in step 204 a search is performed based on a set of tracks (e.g., a set of ten million commercially recorded tracks) stored in one or more databases to determine tracks that match (step 206), such as one or more matching pairs of tracks (A, B). Each track may include, for example, information representing instrumental and vocal activity (if any), and an associated string of metadata which can be arranged in a table of a database. For example, as shown in the example table depicted in FIG. 1, the metadata for each track (e.g., track1, track2 . . . track-n) can include various types of identifying information, such as, by example and without limitation, the track tide 100, artist name 102, track duration 104, the track type 106 (e.g., whether the track is "instrumental" or "original", arranged by columns in the table. In one example embodiment herein, step 204 includes evaluating the metadata for each track to match (in step 206) all tracks that meet predetermined criteria. For example, in the example embodiment herein, the matching of step 206 is performed based on the metadata identifying information (i.e., track titles, artist names, track durations etc.) about the tracks, to match and identify all tracks (A, B) determined to meet the following criteria:

tracks A and B are recorded by a same artist;
the term "instrumental" does not appear in the title (or type) of track A;
the term "instrumental" does appear in the title (or type) of track B;
the titles of tracks A and B are fuzzy matches; and
the track durations of tracks A and B differ by less than a predetermined time value (e.g., 10 seconds).

According to one example embodiment herein, the fuzzy matching is performed on track titles by first formatting them to a standardized format, by, for example, latinizing non-ASCII characters, removing parenthesized text, and then converting the result to lower-case text. In one example, this process yields about 164k instrumental tracks, although this example is non-limiting. Also in one example embodiment herein, the method may provide a 1:n, n:n, or many-to-many mapping, in that an original song version may match to several different instrumentals in step 206, and vice versa. Thus, although described herein in terms of an example case where tracks A and B can be matched, the invention is not so limited, and it is within the scope of the invention for more than two tracks to be matched together in step 206, and for more than two or a series of tracks to be matched in step 206. For example, multiple pairs or multiples series of tracks can be matched in that step.

In step 208, matching versions of a track, such as a pair of tracks (A, B) that were matched in step 206, are marked or otherwise designated (e.g., in a memory) as being either "instrumental" or "original", based on whether or not the term "instrumental" appears in the metadata associated with those tracks. In the present example wherein the metadata of track A does not indicate that it is an instrumental, and where the metadata of track B does indicate that track B is an instrumental, then the matching tracks (A, B) are marked as "(original, instrumental)".

In one example embodiment herein, at least some of the results of step 206 can be evaluated manually (or automatically) to check for quality in step 210, since it may occur that some tracks were matched that should not have been matched. In general, such undesired matching can be a result of one or more errors, such as, for example, instrumental tracks appearing on multiple albums (such as compilations or movie soundtracks, where the explicit description of the track as "instrumental" may be warranted by the context). Pairs that are suspected of being incorrectly matched can be identified using a procedure according to an example aspect herein. For example an audio fingerprinting algorithm can be used to remove suspect pairs from the candidate set. In one example embodiment, that step is performed using an open-source fingerprinting algorithm, and the procedure described in Reference [34], can be employed although in other embodiments other types of algorithms can be employed. Reference [34] is hereby incorporated by reference in its entirety, as if set forth fully herein.

Figure 3:
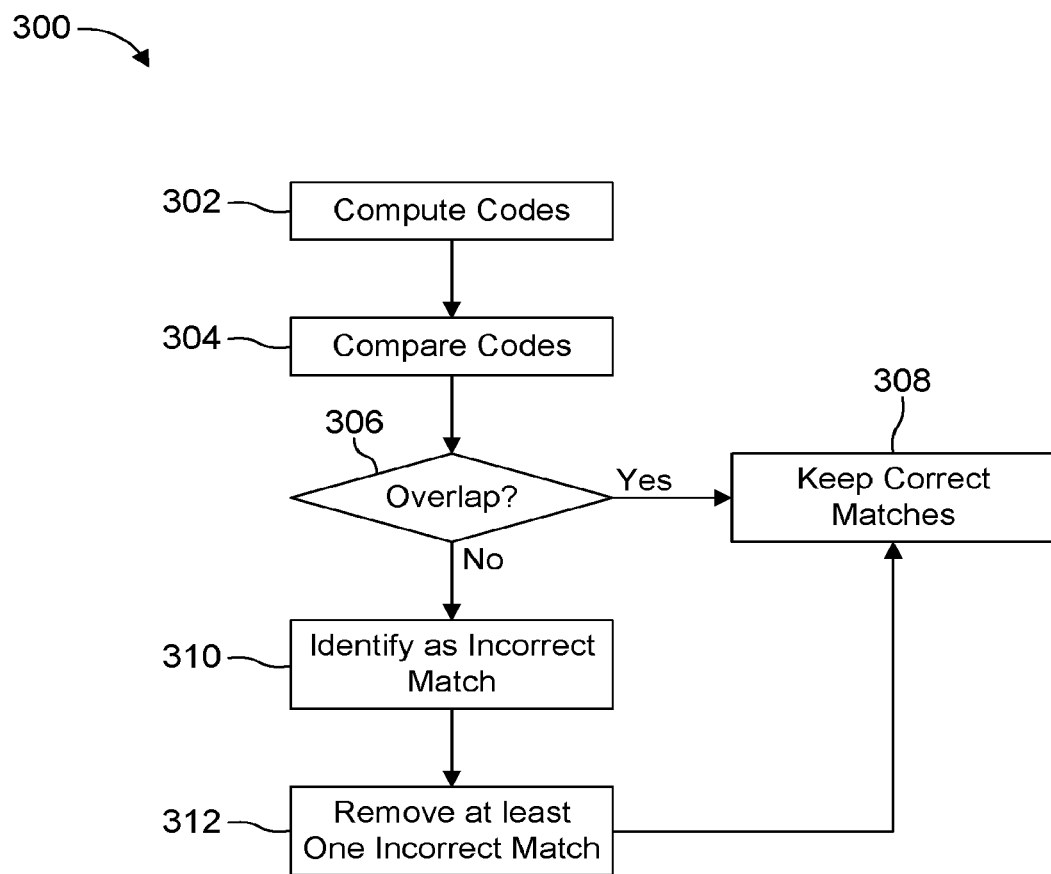
FIG. 3 is a flow diagram of a procedure for performing a quality check to identify incorrectly matches tracks, and further represents a step 210 of FIG. 2.

In one example embodiment, step 210 is performed according to procedure 300 illustrated in FIG. 3. Referring now to FIG. 3, for each matched track A and B a code sequence is computed using, in one example, a fingerprinting algorithm (step 302). Any suitable type of known fingerprinting algorithm for generating a code sequence based on a track can be employed. Next, in step 304 the code sequences for the respective, matched tracks A and B are compared using, in one example embodiment herein, a Jaccard similarity. If sequences are determined based on the Jaccard similarity to overlap within a predetermined range of acceptability ("Yes" in step 306), then the corresponding tracks are identified as being correctly matched in step 308. The predetermined range of acceptability can be defined by upper and lower boundaries of acceptability.

If, on the other hand, the comparison performed in step 304 results in a determination that the code sequences do not overlap within the predetermined range of acceptability ("No" in step 306), then in step 310 the tracks are determined to be matched incorrectly, and thus at least one of them is removed from the results (step 312), and only those that remain are deemed to be correctly matched (step 308). A determination of "No" in step 306 may be a result of, for example, the codes not overlapping enough (e.g., owing to an erroneous fuzzy metadata match), or the codes overlapping too much (i.e., beyond the predetermined range of acceptability), which may occur in cases where, for example, the tracks are identical (e.g., the tracks are both instrumental or both vocal).

The performance of step 312 may result in the removal of both tracks A and B, in certain situations. However, in the case for a 1:n, n:n, or many-to-many matching in earlier step 206, then only those tracks B which were determined to be matched with track A incorrectly are removed in step 312. In one example embodiment herein, step 312 is performed so that each original track is linked to only one non-redundant, instrumental track. The result of the performance of step 312 in that embodiment is that only pair(s) of tracks A, B deemed to match within the predetermined range of acceptability remain (step 308).

In one sample case where 10 million commercially available tracks are evaluated using the procedures 200 and 300, the processes yielded roughly 24,000 tracks, or 12,000 original-instrumental pairs, totaling about 1500 hours of audio track durations. 24,000 strongly labeled tracks were obtained for use as a training dataset.

Estimation of Vocal Activity

Figure 4:
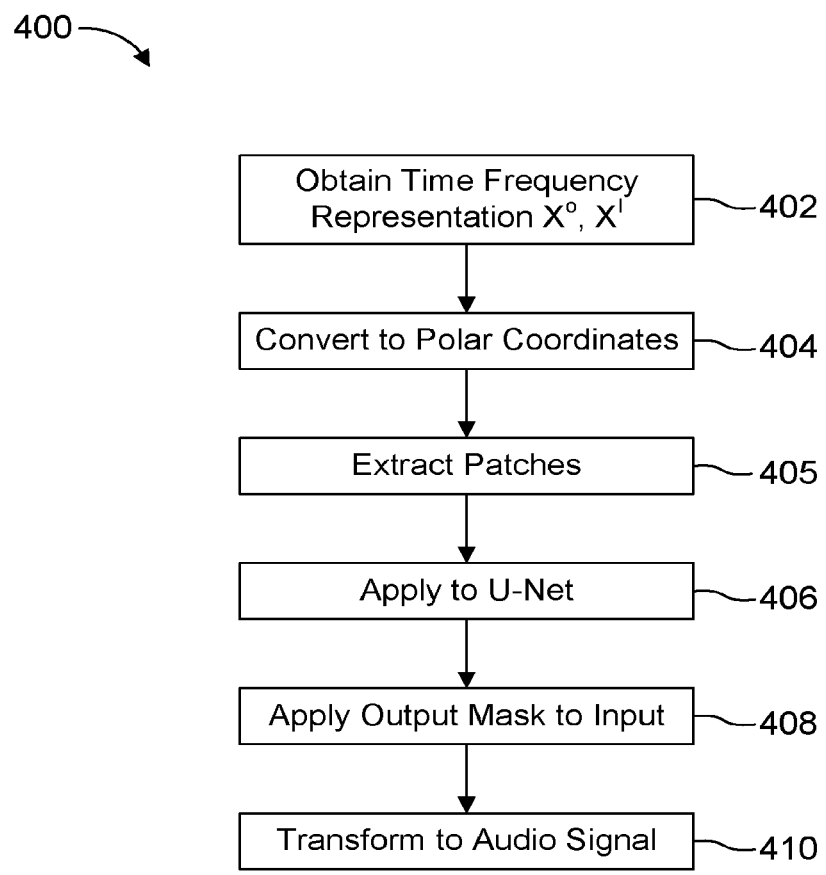
FIG. 4 is a flow diagram of a procedure for estimating a vocal or instrumental component of an audio signal, according to an example aspect herein.

Before describing how matches tracks A, B are employed for training according to an example aspect herein, the manner in which vocal or non-vocal activity can be separated from a track and/or predicted, according to an example aspect herein, will first be described. FIG. 4 is a flow diagram of a procedure 400 according to an example embodiment herein, and FIG. 6a shows a block diagram of an example embodiment of a neural network system 600 for performing the procedure 400. For purposes of the following description, $T^O$ and $T^I$ are employed to denote tracks, in particular, an "original" ("mixed") track and an "instrumental" track, respectively, that are available, and it is assumed that it is desired to obtain the vocal and/or instrumental component of a provided "original" ("mixed") track (also referred to as a "mixed original signal"). Generally, the procedure 400 according to the present example aspect of the present application includes computing a Time-Frequency Representation (TFR) for the tracks $T^O$ and $T^I$, using a TFR obtainer 602, to yield corresponding TFRs $X^O$ and $X^I$, respectively, in the frequency domain (step 402), wherein the TFRs $X^O$ and $X^I$ each are a spectrogram of 2D coefficients, having frequency and phase content, and then performing steps 404 to 410 as will be described below. It should be noted that, although described herein in the context of steps 402 to 405 being performed together for both types of tracks $T^O$ and $T^I$ (i.e., an "original" track and an "instrumental" track), the scope of the invention herein is not so limited, and in other example embodiments herein, those steps 402 to 405 may be performed separately for each separate type of track. In other example embodiments, steps 402 to 405 are performed for the "original" ("mixed") track, such as, for example, in a case where it is desired to predict or isolate the instrumental or vocal component of the track, and steps 402 to 405 are performed separately for the instrumental track, for use in training (to be described below) to enable the prediction/isolation to occur. In one example, step 402 is performed according to the procedures described in Reference [39], which is incorporated by reference herein in its entirety, as if set forth fully herein.

At step 404, the pair of TFRs ($X^O$, $X^I$) obtained in step 402 undergoes a conversion (by polar coordinate converter 604) to polar coordinates including magnitude and phase components, representing a frequency intensity at different points in time. The conversion produces corresponding spectrogram components ($Z^O$, $Z^I$), wherein the components ($Z^O$, $Z^I$) are a version of the pair of TFRs ($X^O$, $X^I$) that has been converted in step 404 into a magnitude and phase representation of the pair of TFRs, and define intensity of frequency at different points in time. The magnitude is the absolute value of a complex number, and the phase is the angle of the complex number. In step 405, patches are extracted from the spectrogram components ($Z^O$, $Z^I$) using patch extractor 606. In one example embodiment herein, step 405 results in slices of the spectrograms from step 404 (by way of polar coordinate converter 604) being obtained along a time axis, wherein the slices are fixed sized images (such as, e.g., 512 bins and 128 frames), according to one non-limiting and non-exclusive example embodiment herein. Patches obtained based on the magnitude of components ($Z^O$, $Z^I$)(wherein such patches also are hereinafter referred to as "magnitude patches ($MP^O$, $MP^I$)" or "magnitude spectrogram patches ($MP^O$, $MP^I$)")). In one example, step 405 is performed according to the procedures described in the Reference [38], which is incorporated by reference herein in its entirety, as if set forth fully herein.

In a next step 406, the magnitude patch ($MP^O$) (e.g., the original mix spectrogram magnitude) obtained in step 405 is applied to a pre-trained network architecture 500, wherein, according to one example aspect herein, the network architecture is a U-Net architecture (also referred to herein as "U-Net architecture 500" or "U-Net 500"). For purposes of the present description of FIG. 4, it is assumed that the U-Net architecture is pre-trained according to, in one example embodiment, procedure 700 to be described below in conjunction with FIG. 7. In one example embodiment herein, the network architecture 500 is similar to the network architecture disclosed in Reference [11] and/or Reference [24], which are incorporated by reference herein in their entireties, as if set forth fully herein, although these examples are non-exclusive and non-limiting.

Figure 5:
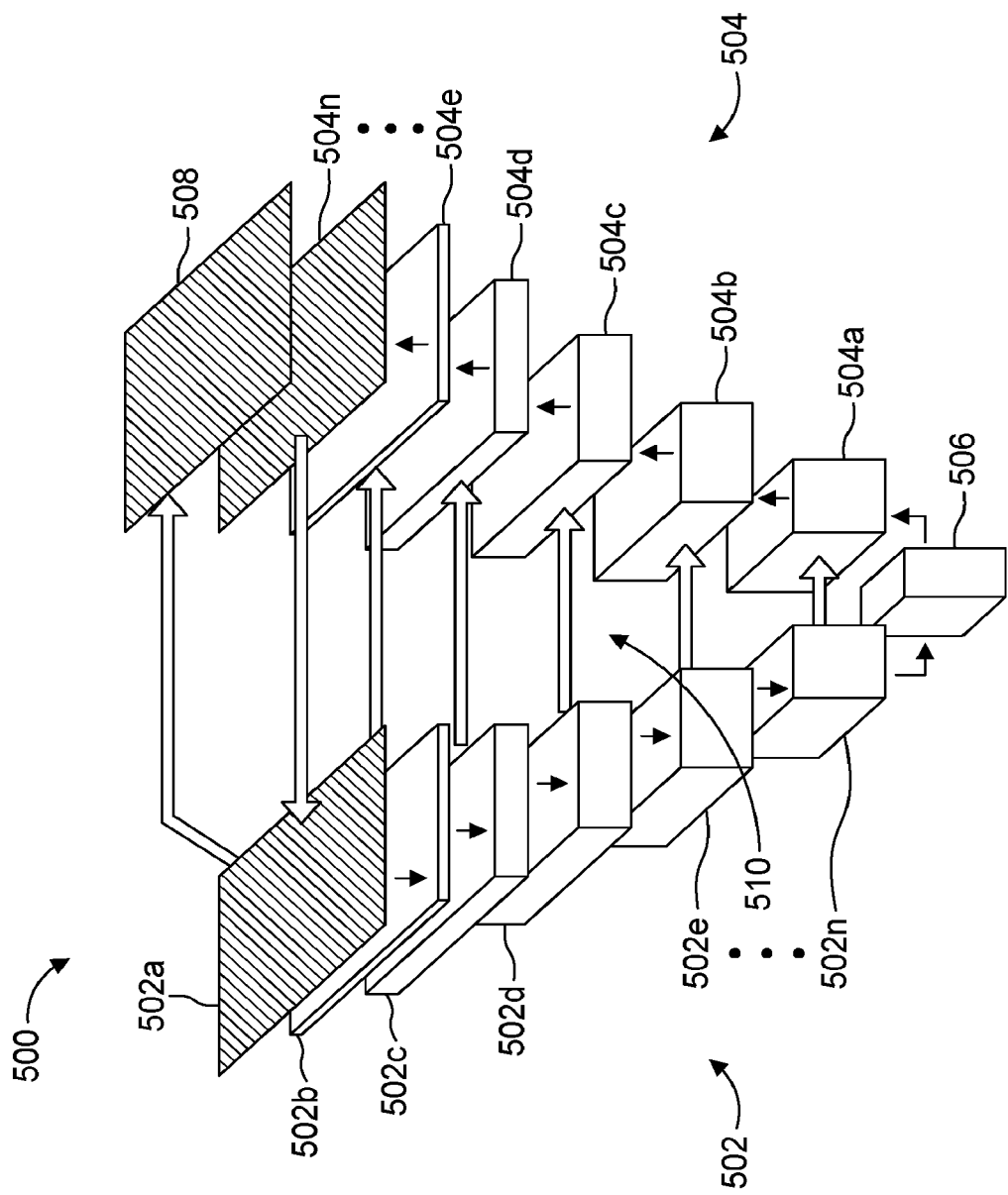
FIG. 5 illustrates a U-Net architecture 500 used in the procedure of FIG. 4, according to an example aspect herein.

FIG. 5 illustrates in more detail one example of U-Net architecture 500 that can be employed according to an example aspect herein. The U-Net architecture 500 comprises a contracting (encoder) path 502 and an expansive (decoder) path 504. In one example embodiment herein, the contracting path 502 can be similar to an architecture of a convolutional network, and includes repeated application of two 3×3 convolutions (unpadded convolutions), and a rectified linear unit (ReLU). More particularly, in the illustrated embodiment, contracting path 502 comprises an input layer 502a representing an input image slice, wherein the input image slice is the magnitude patch ($MP^O$) obtained from step 405. Contracting path 502 also comprises a plurality of downsampling layers 502b to 502n, where, in one example embodiment herein, n equals 5, and each downsampling layer 502b to 502n performs a 2D convolution that halves the number of feature channels. For convenience, each layer 502b to 502n is represented by a corresponding image slice, Also in the illustrated embodiment, expansive path 504 comprises a plurality of upsampling layers 504a to 504n, wherein, in one example embodiment herein, n equals 5 and each upsampling layer 504a to 504n performs a 2D deconvolution that doubles the number of feature channels, and where at least some of the layers 504a to 504n, such as, e.g., layers 504a to 504c, also perform spatial dropout. Additionally, a layer 506 is included in the U-Net architecture 500, and can be said to be within each path 502 and 504 as shown. According to one example embodiment herein, contracting path 502 operates according to that described in Reference [36], which is incorporated by reference herein in its entirety, as if set forth fully herein, although that example is non-exclusive and non-limiting.

Also in one example embodiment herein, each layer of path 502 includes a strided 2D convolution of stride 2 and kernel size 5×5, batch normalization, and leaky rectified linear units (ReLU) with leakiness 0.2. The layers of path 504 employ strided deconvolution (also referred to as "transposed convolution") with stride 2 and kernel size 5×5, batch normalization, plain ReLU, and a 50% dropout (in the first three layers). In at least the final layer (e.g., layer 504n), a sigmoid activation function can be employed, in one example embodiment herein.

Each downsampling layer 502b to 502n reduces in half the number of bins and frames, while increasing the number of feature channels. For example, where the input image of layer 502a is a 512×128×1 image slice (where 512 represents the number of bins, 128 represents the number of frames, and 1 represents the number of channels), application of that image slice to layer 502b results in a 256×64×16 image slice. Application of that 256×64×16 image slice to layer 502c results in a 128×32×32 image slice, and application of the 128×32×32 image slice to subsequent layer 502d results in a 64×16×64 image slice. Similarly, application of the 64×16×64 image slice to subsequent layer 502e results in a 32×8×128 image slice, and application of the 32×8×128 image slice to layer 502n results in a 16×4×256 image slice. Similarly, application of the 64×4×256 image slice to layer 506 results in a 8×2×512 image slice. Of course, the foregoing values are examples only, and the scope of the invention is not limited thereto.

Each layer in the expansive path 504 upsamples the (feature map) input received thereby followed by a 2×2 convolution ("up-convolution") that doubles the number of bins and frames, while reducing the number of channels. Also, a concatenation with the correspondingly cropped feature map from the contracting path is provided, and two 3×3 convolutions, each followed by a ReLU.

In an example aspect herein, concatenations are provided by connections between corresponding layers of the paths 502 and 504, to concatenate post-convoluted channels to the layers in path 504. This feature is because, in at least some cases, when an image slice is provided through the path 504, at least some details of the image may be lost. As such, predetermined features (also referred to herein as "concatenation features") 510 (such as, e.g., features which preferably are relatively unaffected by non-linear transforms) from each post-convolution image slice in the path 502 are provided to the corresponding layer of path 504, where the predetermined features are employed along with the image slice received from a previous layer in the path 504 to generate the corresponding expanded image slice for the applicable layer. More particularly, in the illustrated embodiment, the 8×2×512 image slice obtained from layer 506, and concatenation features 510 from layer 502n, are applied to the layer 504a, resulting in a 16×4×256 image slice being provided, which is then applied along with concatenation features 510 from layer 502e to layer 504b, resulting in a 32×8×128 image slice being provided. Application of that 32×8×128 image slice, along with concatenation features 510 from layer 502d, to layer 504c results in a 64×16×64 image slice, which is then applied along with concatenation features 510 from layer 502c to layer 504d, resulting in a 128×32×32 image slice being provided. That latter image slice is then applied, along with concatenation features 510 from layer 502b, to layer 504e, resulting in a 256×16×16 image slice being provided, which, after being applied to layer 504n, results in a 512×128×1 image slice being provided. In one example embodiment herein, cropping may be performed to compensate for any loss of border pixels in every convolution.

Having described the U-Net architecture 500 of FIG. 5, the next step of the procedure 400 of FIG. 4 will now be described. In step 408, the output of layer 504n is employed as a mask for being applied by mask combiner 608 to the input image of layer 502a, to provide an estimated magnitude spectrogram 508, which, in an example case where the U-Net architecture 500 is trained to predict/isolate an instrumental component of a mixed original signal, is an estimated instrumental magnitude spectrum (of course, in another example case where the U-Net architecture 500 is trained to predict/isolate a vocal component of a mixed original signal, the spectrogram is an estimated vocal magnitude spectrum). That step 408 is performed to combine the image (e.g., preferably a magnitude component) from layer 504n with the phase component from the mixed original spectrogram 502a to provide a complex value spectrogram having both phase and magnitude components (i.e., to render independent of the amplitude of the original spectrogram). Step 408 may be performed in accordance with any suitable technique.

The result of step 408 is then applied in step 410 to an inverse Short Time Fourier Transform (ISTFT) component 610 to transform (by way of a ISTFT) the result of step 408 from the frequency domain, into an audio signal in the time domain (step 410). In a present example where it is assumed that the U-Net architecture 500 is trained to learn/predict instrumental components of input signals (i.e., the mixed original signal, represented by the component $MP^O$ applied in step 406), the audio signal resulting from step 410 is an estimated instrumental audio signal. For example, the estimated instrumental audio signal represents an estimate of the instrumental portion of the mixed original signal first applied to the system 600 in step 402. In the foregoing manner, the instrumental component of a mixed original signal that includes both vocal and instrumental components can be obtained/predicted/isolated.

To obtain the vocal component of the mixed original signal, a method according to the foregoing procedure 400 is performed using system 600, but for a case where the U-Net architecture 500 is trained (e.g., in a manner as will be described later) for learn/predict vocal components of mixed signals. For example, the procedure for obtaining the vocal component includes performing steps 402 to 410 in the manner described above, except that, in one example embodiment, the U-Net architecture 500 employed in step 406 has been trained for estimating a vocal component of mixed original signals applied to the system 600. As a result of the performance of procedure 400 for such a case, the spectrogram 508 obtained in step 408 is an estimated vocal magnitude spectrum, and the audio signal obtained in step 410 is an estimated vocal audio signal, which represents an estimate of the vocal component of the mixed original signal applied to system 600 in step 402 (and an estimate of the component $MP^O$ applied to the U-Net architecture 500 in step 406).

Dataset

In one example embodiment herein, the model architecture assumes that training data is available in the form of a triplet (mixed original signal, vocal component, instrumental component), as would be the case in which, for example, access is available to vast amounts of unmixed multi-track recordings. In other example embodiments herein, an alternative strategy is provided to provide data for training a model. For example, one example solution exploits a specific but large set of commercially available recordings in order to "construct" training data: instrumental versions of recordings. Indeed, in one example embodiment, the training data is obtained in the manner described above in connection with FIGS. 1-3.

Training

In one example embodiment herein, the model herein can be trained using an ADAM optimizer. One example of an ADAM optimizer that can be employed is described in Reference [12], which is incorporated by reference herein in its entirety, as if set forth fully herein, although this example is non-limiting and non-exclusive. Given the heavy computational requirements of training such a model, in one example embodiment herein, input audio is downsampled to 8192 Hz in order to speed up processing. Then, a Short Time Fourier Transform is computed with a window size of 1024 and a hop length of 768 frames, and patches of, e.g., 128 frames (roughly 11 seconds) are extracted, which then are fed as input and targets to the U-Net architecture 500. Also in this example embodiment, the magnitude spectrograms are normalized to the range [0, 1]. Of course, these examples are non-exclusive and non-limiting.

Figure 7:
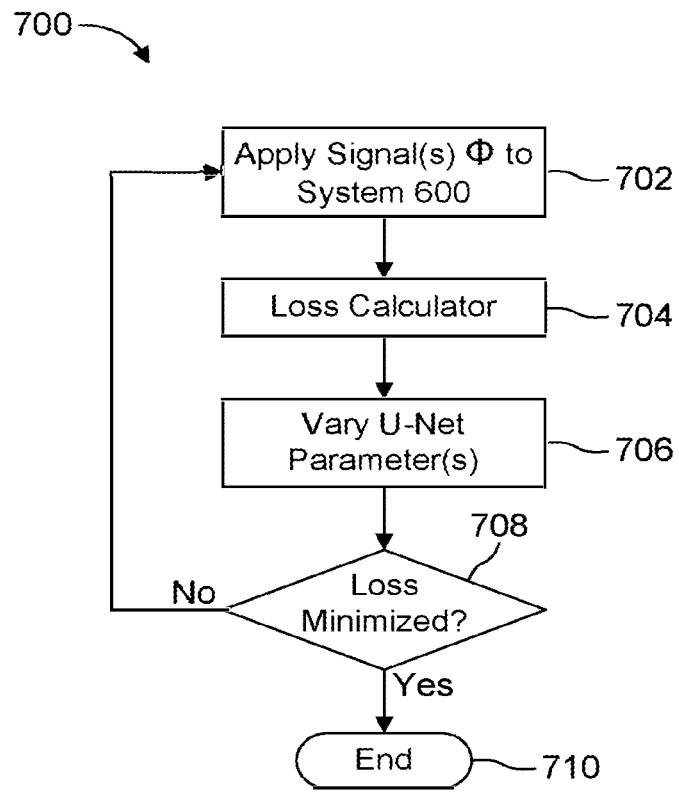
FIG. 7 is a flow diagram of a procedure to train for estimation of a vocal or instrumental of an audio signal, according to an example aspect herein.

The manner in which training is performed, according to an example embodiment herein, will now be described in greater detail, with reference to FIGS. 6b and 7. In the present example embodiment, it is assumed that it is desired to train the U-Net architecture 500 to learn to predict/isolate an instrumental component of mixed original signals e used as training data, wherein, in one example embodiment, the mixed original signals e used for training are "original" tracks A such as those identified as being correct matches with corresponding "instrumental" tracks B in step 308 of FIG. 3 described above. Referring to FIG. 6b, the system 600 is shown, along with additional elements including a loss calculator 612 and a parameter adaptor 614. The system 600, loss calculator 612, and parameter adaptor 614 form a training system 650. The system 600 of FIG. 6b is the same as that of FIG. 6a, except that U-Net the architecture 500 is assumed not to be trained, in the present example, at least at the start of procedure 700.

In one example embodiment herein, in step 702 the system 600 of FIG. 6b is fed with short time fragments of at least one signal φ, and the system 600 operates as described above and according to steps 402 to 410 of FIG. 4 described above, in response to the signal φ (except that the U-Net architecture 500 is assumed not to be fully trained yet). For each instance of the signal φ applied to the system 600 of FIG. 6b, the system 600 provides an output $f(X, \Theta)$ from the mask combiner 608, to the loss calculator 612. Also, input to the loss calculator 612, according to an example embodiment herein, is a signal Y, which represents the magnitude of the spectrogram of the target audio. For example, in a case where it is desired to train the architecture to predict/isolate an instrumental component of an original mixed signal (such as a track "A"), then the target audio is the "instrumental" track B (from step 308) corresponding thereto, and the magnitude of the spectrogram of that track "B" is obtained for use as signal Y via application of a Short Time Fourier Transform (STFT) thereto. In step 704 the loss calculator 612 employs a loss function to determine how much difference there is between the output $f(X, \Theta)$ and the target, which, in this case, is the target instrumental (i.e., the magnitude of the spectrogram of the track "B"). In one example embodiment herein, the loss function is the $L_{1,1}$ norm (e.g., wherein the norm of a matrix is the sum of the absolute values of its elements) of a difference between the target spectrogram and the masked input spectrogram, as represented by the following formula (F1):

$$L(X,Y;\Theta)=\|f(X,\Theta)\otimes X-Y\| \quad (F1)$$

where X denotes the magnitude of the spectrogram of the original, mixed signal (e.g., including both vocal and instrumental components), Y denotes the magnitude of the spectrogram of the target instrumental (or vocal, where a vocal signal is used instead) audio (wherein Y may be further represented by either Yv for a vocal component or Yi for an instrumental component of the input signal), $f(X, \Theta)$ represents an output of mask combiner 608, and $\Theta$ represents the U-Net (or parameters thereof). For the case where the U-Net is trained to predict instrumental spectrograms, denotation $\Theta$ may be further represented by $\Theta_i$ (whereas for the case where the U-Net is trained to predict vocal spectrograms, denotation $\Theta$ may be further represented by $\Theta_v$.) In the above formula F1, the expression $f(X, \Theta)\otimes X$ represents masking of the magnitude X (by mask combiner 608) using the version of the magnitude X after being applied to the U-Net 500.

A result of formula F1 is provided from loss calculator 612 to parameter adaptor 614, which, based on the result, varies one or more parameters of the U-Net architecture 500, if needed, to reduce the loss value (represented by L(X, Y; Θ)) (step 706). Procedure 700 can be performed again in as many iterations as needed to substantially reduce or minimize the loss value, in which case the U-Net architecture 500 is deemed trained. For example, in step 708 it is determined whether the loss value is sufficiently minimized. If "yes" in step 708, then the method ends at step 710 and the architecture is deemed trained. If "no" in step 708, then control passes back to step 702 where the procedure 700 is performed again as many times as needed until the loss value is deemed sufficiently minimized.

The manner in which the parameter adaptor 614 varies the parameters of the U-Net architecture 500 in step 706 can be in accordance with any suitable technique, such as, by example and without limitation, that disclosed in Reference [36], which is incorporated by reference herein in its entirety, as if set forth fully herein. In one example embodiment, step 706 may involve altering one or more weights, kernels, and/or other applicable parameter values of the U-Net architecture 500, and can include performing a stochastic gradient descent algorithm.

Figure 8:
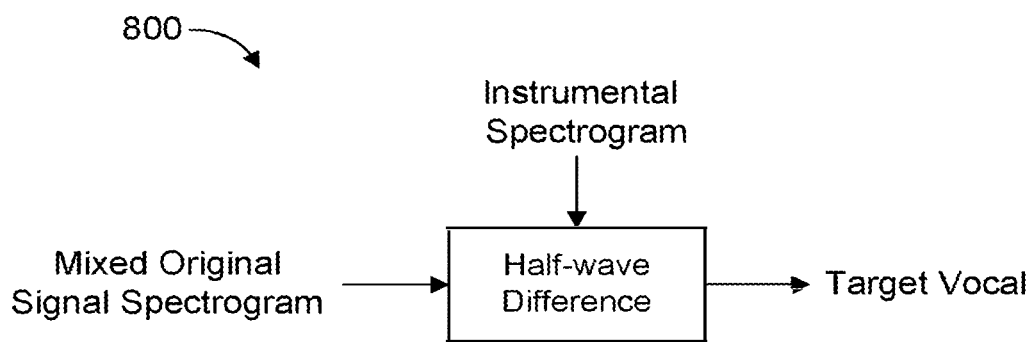
FIG. 8 is a flow diagram of a procedure for determining a target vocal component for use in the procedure of FIG. 7.

A case where it is desired to train the U-Net architecture 500 to predict a vocal component of a mixed original signal will now be described. In this example embodiment, the procedure 700 is performed in the same manner as described above, except that the signal Y provided to the loss calculator 612 is a target vocal signal corresponding to the mixed original signal(s) φ (track(s) A) input to the system 650 (i.e., the target vocal signal and mixed original signal are deemed to be a match). The target vocal signal may be obtained from a database of such signals, if available (and a magnitude of the spectrogram thereof can be employed). In other example embodiments, and referring to the procedure 800 of FIG. 8, the target vocal signal is obtained by determining the half-wave difference between the spectrogram of the mixed original signal (i.e., the magnitude component of the spectrogram, which preferably is representation after the time-frequency conversion via STFT by TFR obtainer 602, polar coordinate conversion via converter 604, and extraction using extractor 606) and the corresponding instrumental spectrogram (i.e., of the instrumental signal paired with the mixed original signal, from the training set, to yield the target vocal signal (step 802). The instrumental spectrogram is preferably a representation of the mixed original signal after the time-frequency conversion via STFT by TFR obtainer 602, polar coordinate conversion via converter 604, and extraction using extractor 606). For either of the above example scenarios for obtaining the target vocal signal, and referring again to FIGS. 6b and 7, the target vocal signal is applied as signal Y to the loss calculator 612, resulting in the loss calculator 612 employing the above formula F1 (i.e., the loss function) to determine how much difference there is between the output $f(X, \Theta)$ and the target (signal Y) (step 704). A result of formula F1 in step 704 is provided from loss calculator 612 to parameter adaptor 614, which, based on the result, varies one or more parameters of the U-Net architecture 500, if needed, to reduce the loss value L(X, Y; Θ) (step 706). Again, procedure can be performed again in as many iterations as needed (as determined in step 708) to substantially reduce or minimize the loss value, in which case the U-Net architecture 500 is deemed trained to predict a vocal component of a mixed original input signal (step 710).

Quantitative Evaluation

To provide a quantitative evaluation, an example embodiment herein is compared to the Chimera model (see, e.g., Reference [15]) that produced the highest evaluation scores in a 2016 MIREX Source Separation campaign. A web interface can be used to process audio clips. It should be noted that the Chimera web server runs an improved version of the algorithm that participated in MIREX, using a hybrid "multiple heads" architecture that combines deep clustering with a conventional neural network (see, e.g., Reference [16]).

For evaluation purposes an additional baseline model was built, resembling the U-Net model but without skip connections, essentially creating a convolutional encoder-decoder, similar to the "Deconvnet" (see, e.g., Reference [19]).

The three models were evaluated on the standard iKala (see, e.g., Reference [5]) and MedleyDB dataset (see, e.g., Reference [3]). The iKala dataset has been used as a standardized evaluation for the annual MIREX campaign for several years, so there are many existing results that can be used for comparison. MedleyDB on the other hand was recently proposed as a higher-quality, commercial-grade set of multi-track stems.

Isolated instrumental and vocal tracks were generated by weighting sums of instrumental/vocal stems by their respective mixing coefficients as supplied by a MedleyDB Python API. The evaluation is limited to clips that are known to contain vocals, using the melody transcriptions provided in both iKala and MedleyDB.

The following functions are used to measure performance: Signal-To-Distortion Ratio (SDR), Signal-to-Interference Ratio (SIR), and Signal-to-Artifact Ratio (SAR) (see, e.g., Reference [31]). Normalized SDR (NSDR) is defined as $$\text{NSDR}(S_e, S_r, S_m) = \text{SDR}(S_e, S_r) - \text{SDR}(S_m, S_r) \tag{F2}$$

where $S_e$ is the estimated isolated signal, $S_r$ is the reference isolated signal, and $S_m$ is the mixed signal. Performance measures are computed using the mireval toolkit (see, e.g., Reference [22]).

Table 2 and Table 3 show that the U-Net significantly outperforms both the baseline model and Chimera on all three performance measures for both datasets.

TABLE 2 iKala mean scores

|  | U-Net | Baseline | Chimera |
| --- | --- | --- | --- |
| NSDR Vocal | 11.094 | 8.549 | 8.749 |
| NSDR Instrumental | 14.435 | 10.906 | 11.626 |
| SIR Vocal | 23.960 | 20.402 | 21.301 |
| SIR Instrumental | 21.832 | 14.304 | 20.481 |
| SAR Vocal | 17.715 | 15.481 | 15.642 |
| SAR Instrumental | 14.120 | 12.002 | 11.539 |

TABLE 3

MedleyDB mean scores

|  | U-Net | Baseline | Chimera |
| --- | --- | --- | --- |
| NSDR Vocal | 8.681 | 7.877 | 6.793 |
| NSDR Instrumental | 7.945 | 6.370 | 5.477 |

TABLE 3-continued

MedleyDB mean scores

|  | U-Net | Baseline | Chimera |
|---|---|---|---|
| SIR Vocal | 15.308 | 14.336 | 12.382 |
| SIR Instrumental | 21.975 | 16.928 | 20.880 |
| SAR Vocal | 11.301 | 10.632 | 10.033 |
| SAR Instrumental | 15.462 | 15.332 | 12.530 |

Figure 9A:
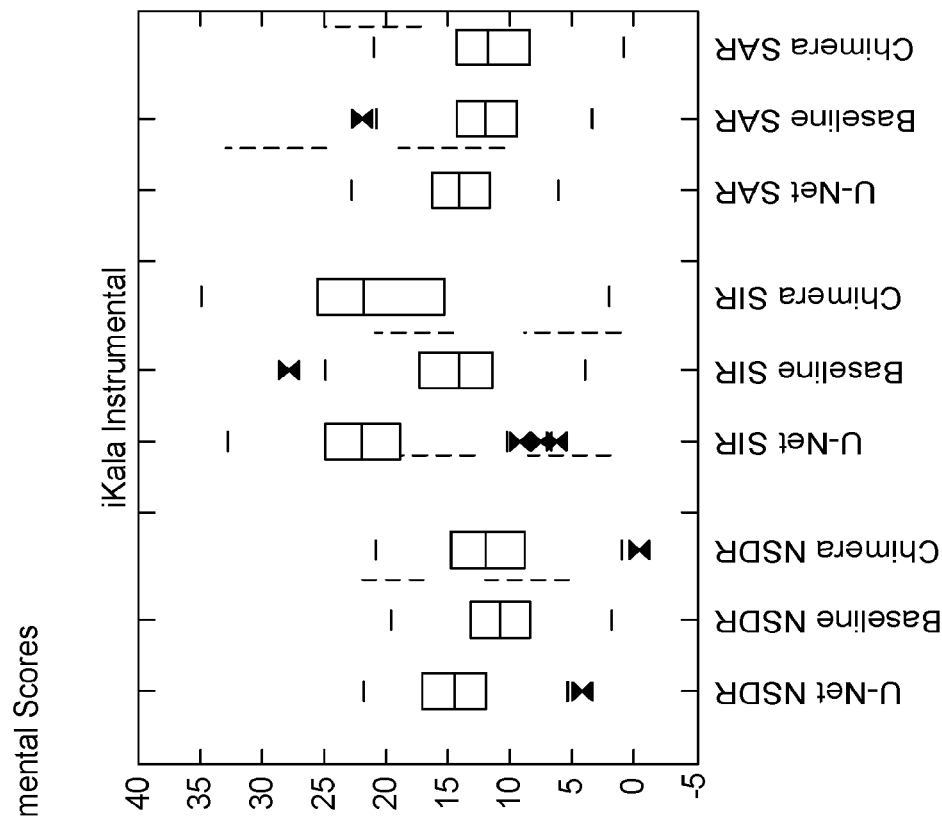
FIG. 9a shows example distributions for various models, in relation to an iKala vocal.
Figure 9B:
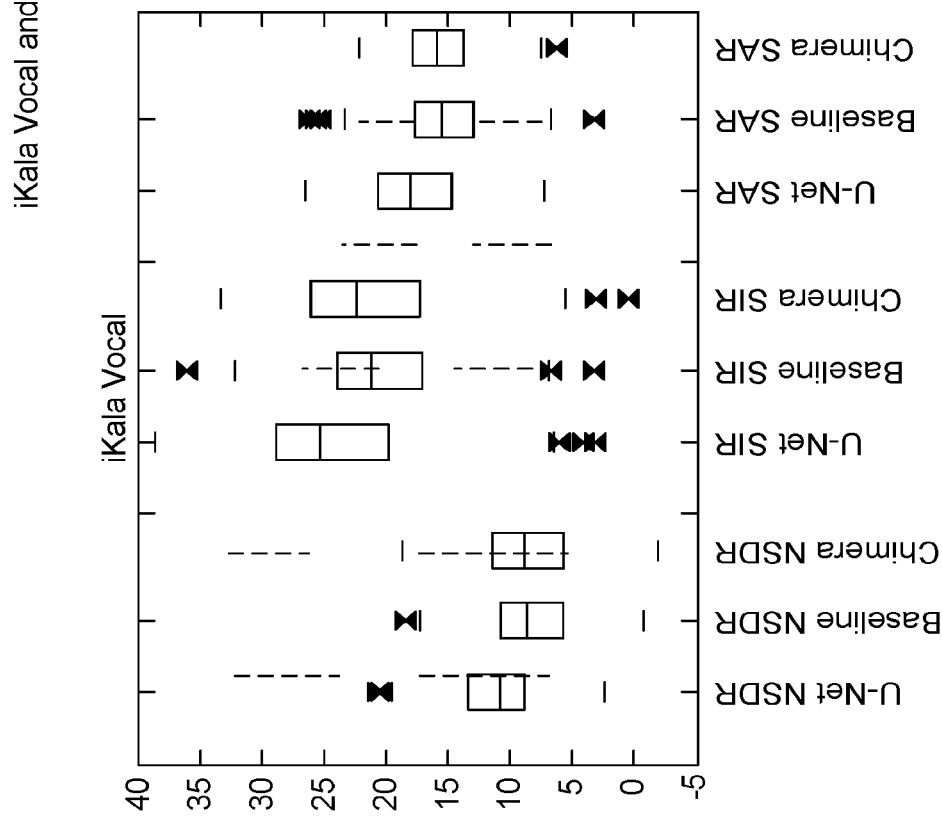
FIG. 9b shows example distributions for various models, in relation to an iKala instrumental.

FIGS. 9a and 9b show an overview of the distributions for the different evaluation measures.

Assuming that the distribution of tracks in the iKala hold-out set used for MIREX evaluations matches those in the public iKala set, results of an example embodiment herein are compared to the participants in the 2016 MIREX Singing Voice Separation task. Table 4 and Table 5 show NSDR scores for the example models herein compared to the best performing algorithms of the 2016 MIREX campaign.

TABLE 4 iKala NSDR Instrumental, MIREX 2016

| Model | Mean | SD | Min | Max | Median |
|---|---|---|---|---|---|
| U-Net | 14.435 | 3.583 | 4.165 | 21.716 | 14.525 |
| Baseline | 10.906 | 3.247 | 1.846 | 19.641 | 10.869 |
| Chimera | 11.626 | 4.151 | −0.368 | 20.812 | 12.045 |
| LCP2 | 11.188 | 3.626 | 2.508 | 19.875 | 11.000 |
| LCP1 | 10.926 | 3.835 | 0.742 | 19.960 | 10.800 |
| MC2 | 9.668 | 3.676 | −7.875 | 22.734 | 9.900 |

TABLE 5 iKala NSDR Vocal, MIREX 2016

| Model | Mean | SD | Min | Max | Median |
|---|---|---|---|---|---|
| U-Net | 11.094 | 3.566 | 2.392 | 20.720 | 10.804 |
| Baseline | 8.549 | 3.428 | −0.696 | 18.530 | 8.746 |
| Chimera | 8.749 | 4.001 | −1.850 | 18.701 | 8.868 |
| LCP2 | 6.341 | 3.370 | −1.958 | 17.240 | 5.997 |
| LCP1 | 6.073 | 3.462 | −1.658 | 17.170 | 5.649 |
| MC2 | 5.289 | 2.914 | −1.302 | 12.571 | 4.945 |

Figure 10A:
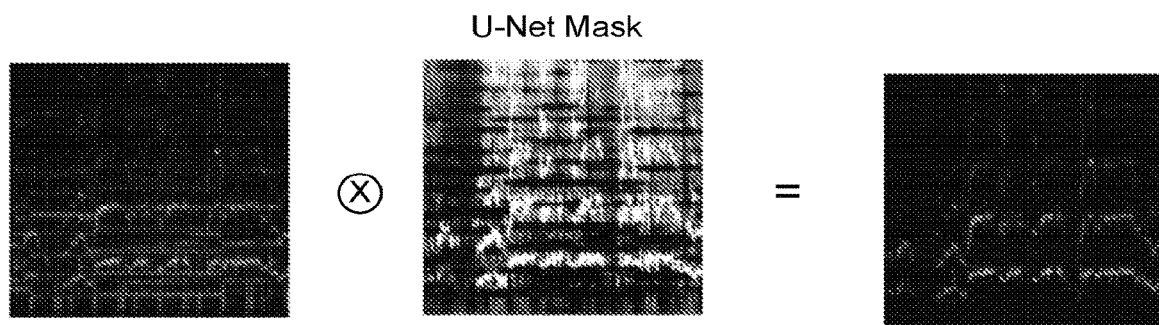
FIG. 10a shows an example representation of a masking procedure according to an example aspect herein, involving a U-Net architecture.
Figure 10B:
FIG. 10b shows an example representation of a masking procedure according to a known baseline.

In order to assess the effect of the U-Net's skip connections, masks generated by the U-Net and baseline models can be visualized. From FIGS. 10a and 10b it is clear that, while the baseline model (FIG. 10b) captures the overall structure, there is a lack of fine-grained detail observable.

Subjective Evaluation

Emiya et al. introduced a protocol for the subjective evaluation of source separation algorithms (see, e.g., Reference [7]). They suggest asking human subjects four questions that broadly correspond to the SDR/SIR/SAR measures, plus an additional question regarding the overall sound quality.

These four questions were asked to subjects without music training, and the subjects found them ambiguous, e.g., they had problems discerning between the absence of artifacts and general sound quality. For better clarity, the survey was distilled into the following two questions in the vocal extraction case:

Quality: "Rate the vocal quality in the examples below."
Interference: "How well have the instruments in the clip above been removed in the examples below?"

For instrumental extraction similar questions were asked:
Quality: "Rate the sound quality of the examples below relative to the reference above."
Extracting instruments: "Rate how well the instruments are isolated in the examples below relative to the full mix above."

Data was collected using CrowdFlower, an online platform where humans carry out micro-tasks, such as image classification, simple web searches, etc., in return for small per-task payments.

In the survey, CrowdFlower users were asked to listen to three clips of isolated audio, generated by U-Net, the baseline model, and Chimera. The order of the three clips was randomized. Each question asked one of the Quality and Interference questions. In an Interference question a reference clip was included. The answers were given according to a 7 step Likert scale (see, e.g., Reference[13]), ranging from "Poor" to "Perfect". FIG. 12 is a screen capture of a CrowdFlower question. In other examples, alternatives to 7-step Likert scale can be employed, such as, e.g., the ITU-R scale (see. e.g., Reference [28]). Tools like CrowdFlower enable quick roll out of surveys, and care should be taken in the design of question statements.

To ensure the quality of the collected responses, the survey was interspersed with "control questions" that the user had to answer correctly according to a predefined set of acceptable answers on the Likert scale. Users of the platform were unaware of which questions are control questions. If questions were answered incorrectly, the user was disqualified from the task. A music expert external to the research group was asked to provide acceptable answers to a number of random clips that were designated as control questions.

For the survey 25 clips from the iKala dataset and 42 clips from MedleyDB were used. There were 44 respondents and 724 total responses for the instrumental test, and 55 respondents supplied 779 responses for the voice test.

FIGS. 13a to 13d show mean and standard deviation for answers provided on CrowdFlower. The U-Net algorithm outperformed the other two models on all questions.

The example embodiments herein take advantage of a U-Net architecture in the context of singing voice separation, and, as can be seen, provide clear improvements over existing systems. The benefits of low-level skip connections were demonstrated by comparison to plain convolutional encoder-decoders.

The example embodiments herein also relate to an approach to mining strongly labeled data from web-scale music collections for detecting vocal activity in music audio. This is achieved by automatically pairing original recordings, containing vocals, with their instrumental counterparts, and using such information to train the U-Net architecture to estimate vocal or instrumental components of a mixed signal.

Figure 11:
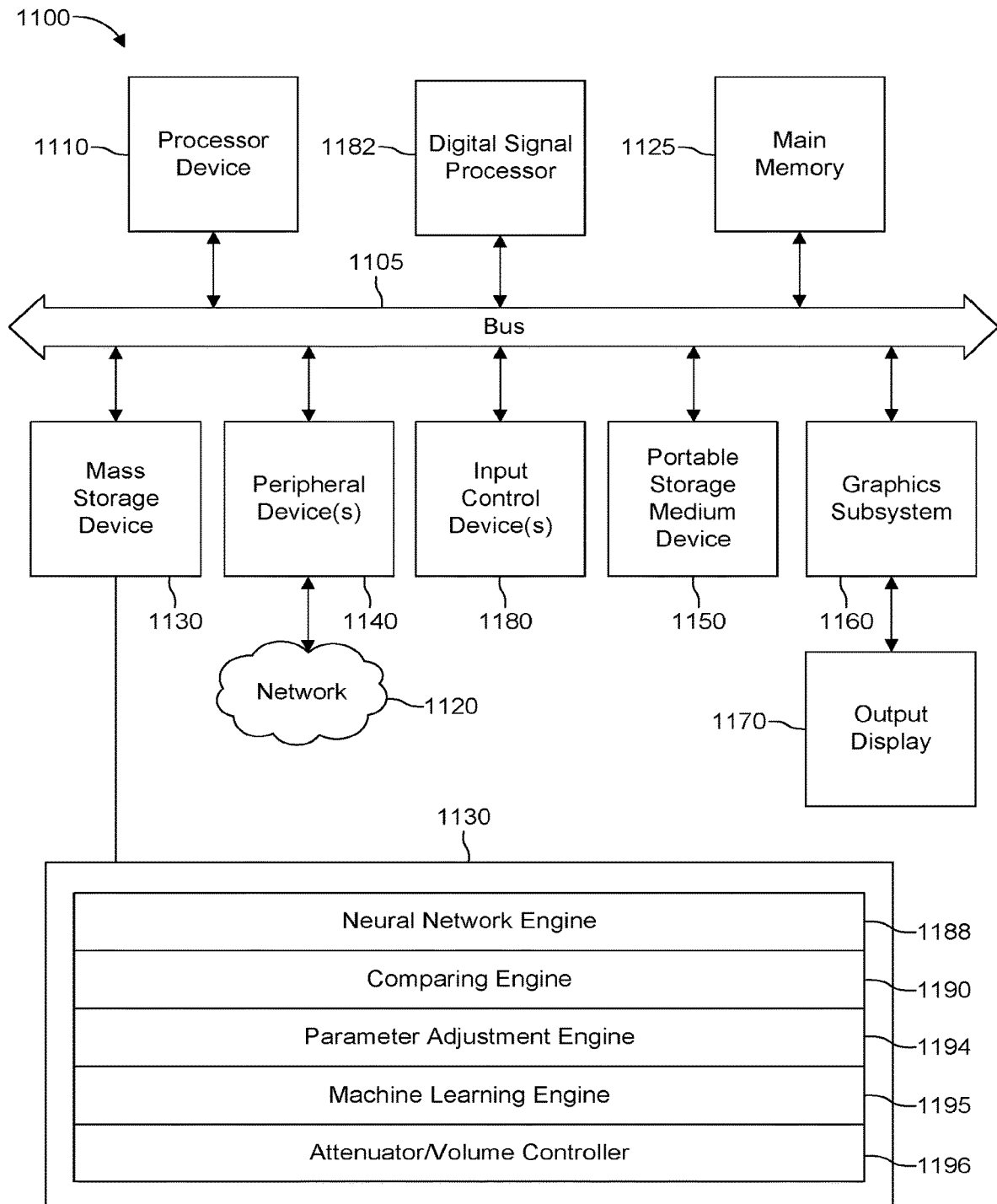
FIG. 11 is a block diagram showing an example computation system constructed to realize the functionality of the example embodiments described herein.
Figure 13A:
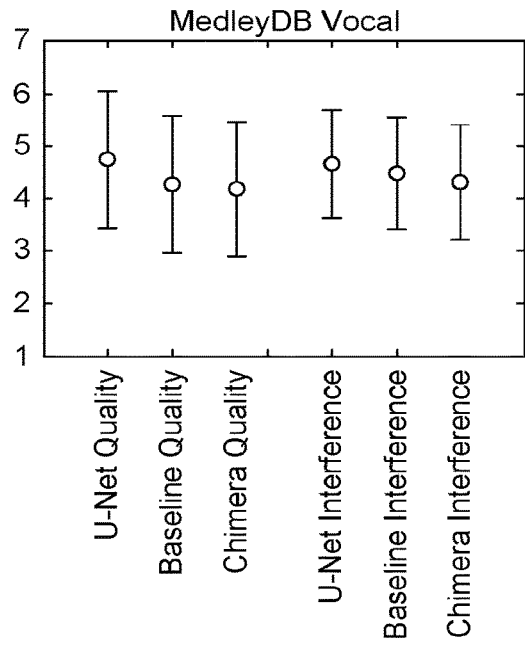
FIG. 13a shows a mean and standard deviation for answers provided on CrowdFlower, for a MedleyDB vocal.
Figure 13B:
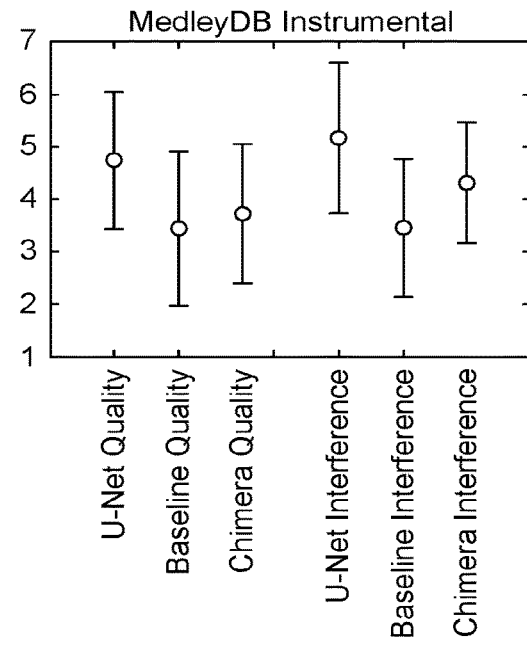
FIG. 13b shows a mean and standard deviation for answers provided on CrowdFlower, for a MedleyDB instrumental, compared to existing systems.
Figure 13C:
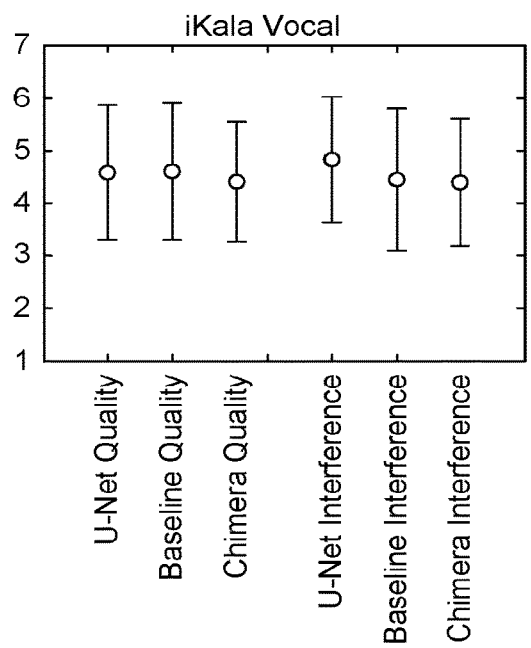
FIG. 13c shows a mean and standard deviation for answers provided on CrowdFlower, for an iKala vocal, compared to existing systems.
Figure 13D:
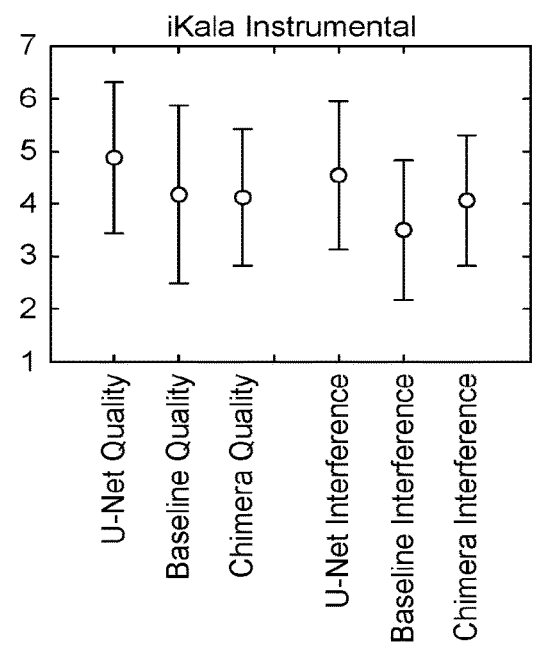
FIG. 13d shows a mean and standard deviation for answers provided on CrowdFlower, for an iKala instrumental, compared to existing systems.

FIG. 11 is a block diagram showing an example computation system 1100 constructed to realize the functionality of the example embodiments described herein.

Acoustic attribute computation system 1100 may include without limitation a processor device 1110, a main memory 1125, and an interconnect bus 1105. The processor device 1110 (410) may include without limitation a single microprocessor, or may include a plurality of microprocessors for configuring the system 1100 as a multi-processor acoustic attribute computation system. The main memory 1125 stores, among other things, instructions and/or data for execution by the processor device 1110. The main memory 1125 may include banks of dynamic random access memory (DRAM), as well as cache memory.

The system 1100 may further include a mass storage device 1130, peripheral device(s) 1140, portable non-transitory storage medium device(s) 1150, input control device(s) 1180, a graphics subsystem 1160, and/or an output display 1170. A digital signal processor (DSP) 1182 may also be included to perform audio signal processing. For explanatory purposes, all components in the system 1100 are shown in FIG. 11 as being coupled via the bus 1105. However, the system 1100 is not so limited. Elements of the system 1100 may be coupled via one or more data transport means. For example, the processor device 1110, the digital signal processor 1182 and/or the main memory 1125 may be coupled via a local microprocessor bus. The mass storage device 1130, peripheral device(s) 1140, portable storage medium device(s) 1150, and/or graphics subsystem 1160 may be coupled via one or more input/output (I/O) buses. The mass storage device 1130 may be a nonvolatile storage device for storing data and/or instructions for use by the processor device 1110. The mass storage device 1130 may be implemented, for example, with a magnetic disk drive or an optical disk drive. In a software embodiment, the mass storage device 1130 is configured for loading contents of the mass storage device 1130 into the main memory 1125.

Mass storage device 1130 additionally stores a neural network system engine (such as, e.g., a U-Net network engine) 1188 that is trainable to predict an estimate or a vocal or instrumental component of a mixed original signal, a comparing engine 1190 for comparing an output of the neural network system engine 1188 to a target instrumental or vocal signal to determine a loss, and a parameter adjustment engine 1194 for adapting one or more parameters of the neural network system engine 1188 to minimize the loss. A machine learning engine 1195 provides training data, and an attenuator/volume controller 1196 enables control of the volume of one or more tracks, including inverse proportional control of simultaneously played tracks.

The portable storage medium device 1150 operates in conjunction with a nonvolatile portable storage medium, such as, for example, a solid state drive (SSD), to input and output data and code to and from the system 1100. In some embodiments, the software for storing information may be stored on a portable storage medium, and may be inputted into the system 1100 via the portable storage medium device 1150. The peripheral device(s) 1140 may include any type of computer support device, such as, for example, an input/output (V/O) interface configured to add additional functionality to the system 1100. For example, the peripheral device(s) 1140 may include a network interface card for interfacing the system 1100 with a network 1120.

The input control device(s) 1180 provide a portion of the user interface for a user of the system 1100. The input control device(s) 1180 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 1100 may include the graphics subsystem 1160 and the output display 1170. The output display 1170 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays. The graphics subsystem 1160 receives textual and graphical information, and processes the information for output to the output display 1170.

Figure 14:
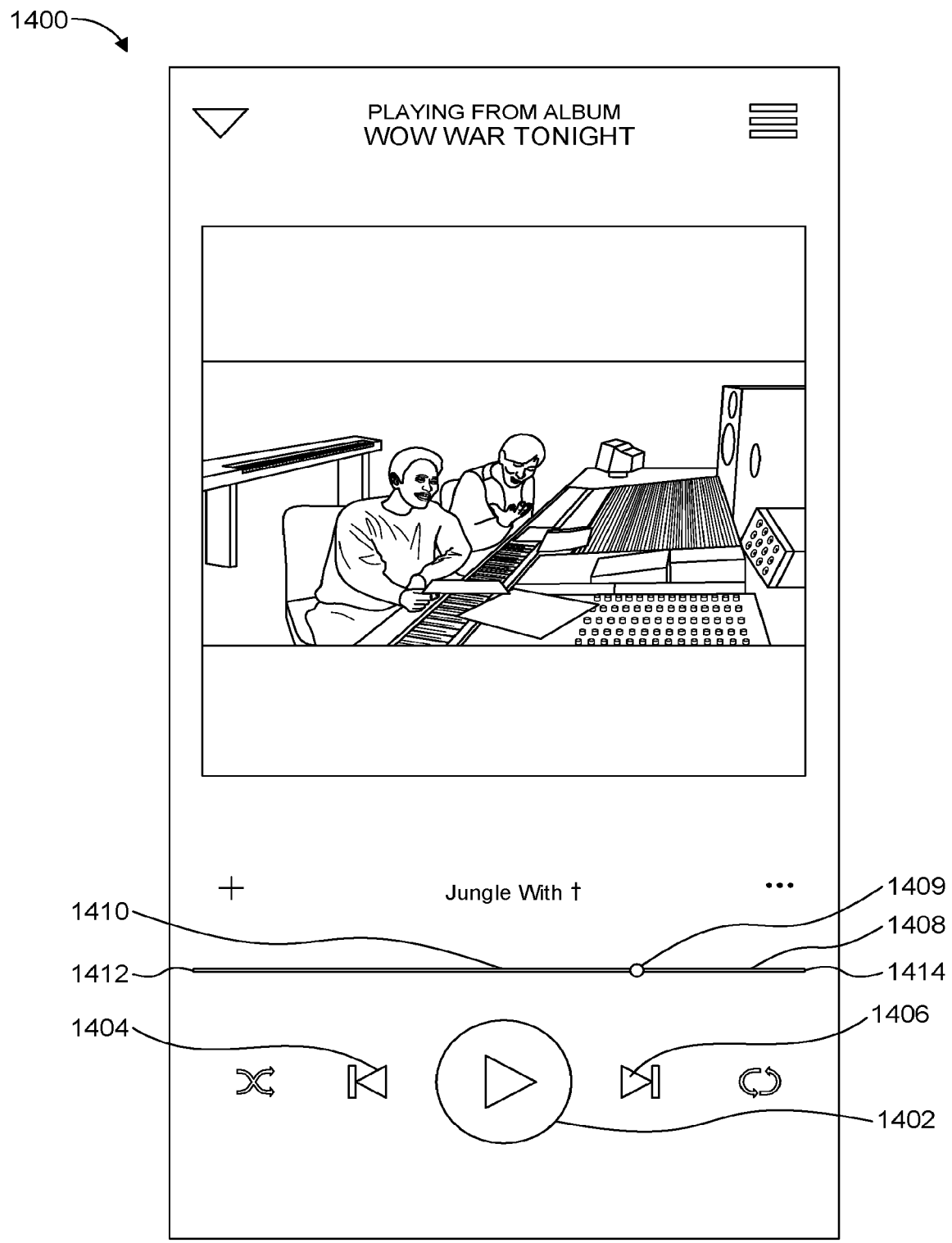
FIG. 14 shows a user interface 1400, including a volume control bar 1408 and a volume control 1409 according to an example aspect herein.

FIG. 14 shows an example of a user interface 1400, which can be provided by way of the output display 1170 of FIG. 11, according to a further example aspect herein. The user interface 1400 includes a play button 1402 selectable for playing tracks, such as tracks stored in mass storage device 1130, for example. Tracks stored in the mass storage device 1130 may include, by example, tracks having both vocal and non-vocal (instrumental) components (i.e., mixed signals), and one or more corresponding, paired tracks including only instrumental or vocal components (i.e., instrumental or vocal tracks, respectively). In one example embodiment herein, the instrumental tracks and vocal tracks may be obtained as described above, including, for example and without limitation, according to procedure FIG. 4, or they may be otherwise available.

The user interface 1400 also includes forward control 1406 and reverse control 1404 for scrolling through a track in either respective direction, temporally. According to an example aspect herein, the user interface 1400 further includes a volume control bar 1408 having a volume control 1409 (also referred to herein as a "karaoke slider") that is operable by a user for attenuating the volume of at least one track. By example, assume that the play button 1402 is selected to playback a song called "Night". According to one non-limiting example aspect herein, when the play button 1402 is selected, the "mixed" original track of the song, and the corresponding instrumental track of the same song (i.e., wherein the tracks may be identified as being a pair according to procedures described above), are retrieved from the mass storage device 1130, wherein, in one example, the instrumental version is obtained according to one or more procedures described above, such as that shown in FIG. 4, for example. As a result, both tracks are simultaneously played back to the user, in synchrony. In a case where the volume control 1409 is centered at position 1410 in the volume control bar 1408, then, according to one example embodiment herein, the "mixed" original track and instrumental track both play at 50% of a predetermined maximum volume. Adjustment of the volume control 1409 in either direction along the volume control bar 1408 enables the volumes of the simultaneously played back tracks to be adjusted in inverse proportion, wherein, according to one example embodiment herein, the more the volume control 1409 is moved in a leftward direction along the bar 1408, the lesser is the volume of the instrumental track and the greater is the volume of the "mixed" original track. For example, when the volume control 1409 is positioned precisely in the middle between a leftmost end 1412 and the center position 1410 of the volume control bar 1408, then the volume of the "mixed" original track is played back at 75% of the predetermined maximum volume, and the instrumental track is played back at 25% of the predetermined maximum volume. When the volume control 1409 is positioned all the way to the leftmost end 1412 of the bar 1408, then the volume of the "mixed" original track is played back at 100% of the predetermined maximum volume, and the instrumental track is played back at 0% of the predetermined maximum volume.

Also according to one example embodiment herein, the more the volume control 1409 is moved in a rightward direction along the bar 1408, the greater is the volume of the instrumental track and the lesser is the volume of the "mixed" original track. By example, when the volume control 1409 is positioned precisely in the middle between the center positon 1410 and rightmost end 1414 of the bar 1408, then the volume of the "mixed" original track is played back at 25% of the predetermined maximum volume, and the instrumental track is played back at 75% of the predetermined maximum volume. When the volume control 1409 is positioned all the way to the right along the bar 1408, at the rightmost end 1414, then the volume of the "mixed" original track is played back at 0% of the predetermined maximum volume, and the instrumental track is played back at 100% of the predetermined maximum volume.

In the above manner, a user can control the proportion of the volume levels between the "mixed" original track and the corresponding instrumental track.

Of course, the above example is non-limiting. By example, according to another example embodiment herein, when the play button 1402 is selected, the "mixed" original track of the song, as well as the vocal track of the same song (i.e., wherein the tracks may be identified as being a pair according to procedures described above), can be retrieved from the mass storage device 1130, wherein, in one example, the vocal track is obtained according to one or more procedures described above, such as that shown in FIG. 4, or is otherwise available. As a result, both tracks are simultaneously played back to the user, in synchrony. Adjustment of the volume control 1409 in either direction along the volume control bar 1408 enables the volume of the simultaneously played tracks to be adjusted in inverse proportion, wherein, according to one example embodiment herein, the more the volume control 1409 is moved in a leftward direction along the bar 1408, the lesser is the volume of the vocal track and the greater is the volume of the "mixed" original track, and, conversely, the more the volume control 1409 is moved in a rightward direction along the bar 1408, the greater is the volume of the vocal track and the lesser is the volume of the "mixed" original track.

In still another example embodiment herein, when the play button 1402 is selected to play back a song, the instrumental track of the song, as well as the vocal track of the same song (wherein the tracks are recognized to be a pair) are retrieved from the mass storage device 1130, wherein, in one example, the tracks are each obtained according to one or more procedures described above, such as that shown in FIG. 4. As a result, both tracks are simultaneously played back to the user, in synchrony. Adjustment of the volume control 1409 in either direction along the volume control bar 1408 enables the volume of the simultaneously played tracks to be adjusted in inverse proportion, wherein, according to one example embodiment herein, the more the volume control 1409 is moved in a leftward direction along the bar 1408, the lesser is the volume of the vocal track and the greater is the volume of the instrumental track, and, conversely, the more the volume control 1409 is moved in a rightward direction along the bar 1408, the greater is the volume of the vocal track and the lesser is the volume of the instrumental track.

Of course, the above-described directionalities of the volume control 1409 are merely representative in nature, and, in other example embodiments herein, movement of the volume control 1409 in a particular direction can control the volumes of the above-described tracks in an opposite manner than those described above, and/or the percentages described above may be different that those described above, in other example embodiments. Also, in one example embodiment herein, which particular type of combination of tracks (i.e., a mixed original signal paired with either a vocal or instrumental track, or paired vocal and instrumental tracks) is employed in the volume control technique described above can be predetermined according to preprogramming in the system 1100, or can be specified by the user by operating the user interface 1400.

Referring again to FIG. 11, the input control devices 1180 will now be described.

Input control devices 1180 can control the operation and various functions of system 1100.

Input control devices 1180 can include any components, circuitry, or logic operative to drive the functionality of system 1100. For example, input control device(s) 1180 can include one or more processors acting under the control of an application.

Each component of system 1100 may represent a broad category of a computer component of a general and/or special purpose computer. Components of the system 1100 (400) are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described herein.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIG. 11 is presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

REFERENCES

[1] Vijay Badrinarayanan, Alex Kendall, and Roberto Cipolla. Segnet: A deep convolutional encoder-decoder architecture for scene segmentation. *IEEE Transactions on Pattern Analysis and Machine Intelligence*, 2017.
[2] Aayush Bansal, Xinlei Chen, Bryan Russell, Ab-hinav Gupta, and Deva Ramanan. Pixelnet: Towards a general pixel-level architecture. *arXiv preprint arXiv:* 1609.06694, 2016.
[3] Rachel M. Bittner, Justin Salamon, Mike Tiemey, Matthias Mauch, Chris Cannam, and Juan Pablo Bello. MedleyDB: A multitrack dataset for annotation-intensive MIR research. In *Proceedings of the 15th International Society for Music Information Retrieval Conference, ISMIR 2014. Taipei, Taiwan, Oct. 27-31, 2014*, pages 155-160, 2014.
[4] Kevin Brown. *Karaoke Idols: Popular Music and the Performance of Identity*. Intellect Books, 2015.
[5] Tak-Shing Chan, Tzu-Chun Yeh, Zhe-Cheng Fan, Hung-Wei Chen, Li Su, Yi-Hsuan Yang, and Roger Jang. Vocal activity informed singing voice separation with the iKala dataset. In *Acoustics, Speech and Signal Processing (ICASSP), 2015 IEEE International Conference on*, pages 718-722. IEEE, 2015.
[6] Pritish Chandna, Marius Miron, Jordi Janer, and Emilia Gómez. Monoaural audio source separation using deep convolutional neural networks. In *International Conference on Latent Variable Analysis and Signal Separation*, pages 258-266. Springer, 2017.
[7] Valentin Emiya, Emmanuel Vincent, Niklas Harlander, and Volker Hohmann. Subjective and objective quality assessment of audio source separation. *IEEE Transactions on Audio, Speech, and Language Processing*, 19(7):2046-2057, 2011.
[8] Emad M Grais and Mark D Plumbley. Single channel audio source separation using convolutional denoising autoencoders. *arXiv preprint arXiv:*1703.08019, 2017.
[9] Po-Sen Huang, Minje Kim, Mark Hasegawa-Johnson, and Paris Smaragdis. Singing-voice separation from monaural recordings using deep recurrent neural networks. In *Proceedings of the 15th International Society for Music Information Retrieval Conference, 1S-MIR 2014, Taipei, Taiwan, Oct. 27-31, 2014*, pages 477-482, 2014.
[10] Eric Humphrey, Nicola Monrecchio, Rachel Bittner, Andreas Jansson, and Tristan Jehan. Mining labeled data from web-scale collections for vocal activity detection in music. In *Proceedings of the 18th ISMIR Conference*, 2017.
[11] Phillip Isola, Jun-Yan Zhu, Tinghui Zhou, and Alexei A Efros. Image-to-image translation with conditional adversarial networks. *arXiv preprint arXiv:*1611.07004, 2016.
[12] Diederik Kingma and Jimmy Ba. Adam: A method for stochastic optimization. *arXiv preprint arXiv:*1412.6980, 2014.
[13] Rensis Likert. A technique for the measurement of attitudes. *Archives of psychology*, 1932.
[14] Jonathan Long, Evan Shelhamer, and Trevor Darrell. Fully convolutional networks for semantic segmentation. In *Proceedings of the IEEE Conference on Computer Vision and Pattern Recognition*, pages 3431-3440, 2015.
[15] Yi Luo, Zhuo Chen, and Daniel P W Ellis. Deep clustering for singing voice separation. 2016.
[16] Yi Luo, Zhuo Chen, John R Hershey, Jonathan Le Roux, and Nima Mesgarani. Deep clustering and conventional networks for music separation: Stronger together. *arXiv preprint arXiv:*1611.06265, 2016.
[17] Annamaria Mesaros and Tuomas Virtanen. Automatic recognition of lyrics in singing. *EURASIP Journal on Audio, Speech, and Music Processing*, 2010(1):546047, 2010.
[18] Annamaria Mesaros, Tuomas Virtanen, and Anssi Klapuri. Singer identification in polyphonic music using vocal separation and pattern recognition methods. In *Proceedings of the 8th International Conference on Music Information Retrieval, ISMIR 2007, Vienna, Austria, Sep. 23-27, 2007*, pages 375-378, 2007.
[19] Hyeonwoo Noh, Seunghoon Hong, and Bohyung Han. Learning deconvolution network for semantic segmentation. In *Proceedings of the IEEE International Conference on Computer Vision*, pages 1520-1528, 2015.
[20] Nicola Orio et al. Music retrieval: A tutorial and review. *Foundations and Trends R in Information Retrieval*, 1(1): 1-90, 2006.
[21] Alexey Ozerov, Pierrick Philippe, Frdric Bimbot, and Rmi Gribonval. Adaptation of bayesian models for single-channel source separation and its application to voice/ music separation in popular songs. *IEEE Transactions on Audio, Speech, and Language Processing*, 15(5):1564-1578, 2007.
[22] Colin Raffel, Brian McFee, Eric J. Humphrey, Justin Salamon, Oriol Nieto, Dawen Liang, and Daniel P. W. Ellis. Mireval: A transparent implementation of common MIR metrics. In *Proceedings of the 15th International Society for Music Information Retrieval Conference, ISMIR 2014, Taipei, Taiwan, Oct. 27-31, 2014*, pages 367-372, 2014.
[23] Zafar Rafii and Bryan Pardo. Repeating pattern extraction technique (REPET): A simple method for music/ voice separation. *IEEE transactions on audio, speech, and language processing*, 21(1):73-84, 2013,

[24] Olaf Ronneberger, Philipp Fischer, and Thomas Brox. U-net: Convolutional networks for biomedical image segmentation. In *International Conference on Medical Image Computing and Computer-Assisted Intervention*, pages 234-241. Springer, 2015.

[25] Andrew J R Simpson, Gerard Roma, and Mark D Plumbley. Deep karaoke: Extracting vocals from musical mixtures using a convolutional deep neural network. In *International Conference on Latent Variable Analysis and Signal Separation*, pages 429-436. Springer, 2015.

[26] Paris Smaragdis, Cedric Fevotte, Gautham J Mysore, Nasser Mohammadiha, and Matthew Hoffman. Static and dynamic source separation using nonnegative factorizations: A unified view. *IEEE Signal Processing Magazine*, 31(3):66-75, 2014.

[27] Philip Tagg. Analysing popular music: theory, method and practice. *Popular music*, 2:37-67, 1982.

[28] Thilo Thiede, William C Treurniet, Roland Bitto, Christian Schmidmer, Thomas Sporer, John G Beerends, and Catherine Colomes. Peaq-the itu standard for objective measurement of perceived audio quality. *Journal of the Audio Engineering Society*, 48(1/2):3-29, 2000.

[29] George Tzanetakis and Perry Cook. Musical genre classification of audio signals. *IEEE Transactions on speech and audio processing*, 10(5):293-302, 2002.

[30] Shankar Vembu and Stephan Baumann. Separation of vocals from polyphonic audio recordings. In *ISMIR 2005, 6th International Conference on Music Information Retrieval*, London, UK, 11-15 Sep. 2005, Proceedings, pages 337-344, 2005.

[31] Emmanuel Vincent, Rémi Gribonval, and Cédric Févotte. Performance measurement in blind audio source separation. *IEEE transactions on audio, speech, and language processing*, 14(4):1462-1469, 2006.

[32] Thomas Virtanen. Monaural sound source separation by nonnegative matrix factorization with temporal continuity and sparseness criteria. *IEEE transactions on audio, speech, and language processing*, 15(3):1066-1074, 2007.

[33] Richard Zhang, Phillip Isola, and Alexei A Efros. Colorful image colorization. In *European Conference on Computer Vision*, pages 649-666. Springer, 2016.

[34] Ellis, Daniel P W, Whitman, Brian, and Porter, Alastair. Echoprint: An open music identification service. In *Proceedings of the 12th International Society for Music Information Retrieval Conference (ISMIR)*. ISMIR, 2011 (2 sheets).

[35] Rosenblatt F.: The perceptron: A probabilistic model for information storage and organization in the brain, *Psychological review*, Vol. 65, No. 6, pp. 386-408.

[36] Goodfellow, Ian, et al. *Deep learning*. Vol. 1. Cambridge: MIT press, 2016. Chapter 9: Convolutional Neural Networks.

[37] Jannson, Andreas et al., *Singing Voice Separation With Deep U-Net Convolutional Networks*, 18th International Society for Music Information Retrieval Conference, Suzhou, China, 2017. Reference [37] is incorporated by reference herein in its entirety, as if set forth fully herein.

[38] Schlüter, Jan, and Sebastian Böck. "Musical onset detection with convolutional neural networks." 6th International Workshop on Machine Learning and Music (MML), Prague, Czech Republic. 2013.

[39] Griffin, Daniel, and Jae Lim. "Signal estimation from modified short-time Fourier transform." IEEE Transactions on Acoustics, Speech, and Signal Processing 32.2 (1984): 236-243.

What is claimed is:

1. A method, comprising:
    receiving, by way of an input user interface of a media player, a selection of a play button;
    playing simultaneously, by way of an output user interface of the media player, and in response to the selection, two different versions of a musical song including a first version and a second version of the musical song, the first version including only an instrumental component of the musical song, and the second version including only a vocal component of the musical song;
    while the two different versions are being played simultaneously by way of the output user interface of the media player, receiving a volume adjustment by way of an adjustment of a volume control of the input user interface of the media player, the volume control being configured such that an adjustment of the volume control in a first direction increases a volume of a first of the two different versions being played by way of the output user interface of the media player and decreases a volume of a second of the two different versions being played by way of the output user interface of the media player, and such that an adjustment of the volume control in a second direction different from the first direction decreases the volume of the first of the two different versions being played by way of the output user interface of the media player and increases the volume of the second of the two different versions being played by way of the output user interface of the media player; and
    in response to receiving the volume adjustment, increasing a volume of one of the two different versions being played by way of the output user interface of the media player and decreasing a volume of the other of the two different versions being played by way of the output user interface of the media player.

2. The method of claim 1, wherein the two different versions of the musical song are two different versions of a same musical song.

3. The method of claim 2, wherein each of the two different versions is generated by isolating it from the same musical song.

4. The method of claim 3, wherein each of the two different versions is isolated from the same musical song using a U-net neural network.

5. The method of claim 1, wherein the increasing increases the volume of the one of the two different versions being played in inverse proportion to the volume of the other of the two different versions being played.

6. The method of claim 1,
    wherein the adjustment of the volume control includes a sliding of a slide bar; and
    wherein the first direction is opposite the second direction.

7. The method of claim 1, wherein the playing simultaneously plays in synchrony the two different versions of the musical song.

8. A media player system, comprising:
    an input user interface
    an output user interface;
    a memory storing a program; and
    a processor coupled to the input user interface, the output user interface and the memory, the processor being controllable by the program to perform a method including:
        receiving, by way of the input user interface, a selection of a play button;

playing simultaneously, by way of the output user interface and in response to the selection, two different versions of a musical song including a first version and a second version of the musical song, the first version including only an instrumental component of the musical song, and the second version including only a vocal component of the musical song;

while the two different versions are being played simultaneously by way of the output user interface, receiving a volume adjustment by way of an adjustment of a volume control of the input user interface, the volume control being configured such that an adjustment of the volume control in a first direction increases a volume of a first of the two different versions being played by way of the output user interface and decreases a volume of a second of the two different versions being played by way of the output user interface, and such that an adjustment of the volume control in a second direction different from the first direction decreases the volume of the first of the two different versions being played by way of the output user interface and increases the volume of the second of the two different versions being played by way of the output user interface; and in response to receiving the volume adjustment, increasing a volume of one of the two different versions being played by way of the output user interface and decreasing a volume of the other of the two different versions being played by way of the output user interface.

9. The system of claim 8, wherein the two different versions of the musical song are two different versions of a same musical song.

10. The system of claim 9, wherein each of the two different versions is generated by isolating it from the same musical song.

11. The system of claim 10, wherein each of the two different versions is isolated from the same musical song using a U-net neural network.

12. The system of claim 8, wherein the increasing increases the volume of the one of the two different versions being played in inverse proportion to the volume of the other of the two different versions being played.

13. The system of claim 8,
wherein the adjustment of the volume control includes a sliding of a slide bar; and
wherein the first direction is opposite the second direction.

14. The system of claim 8, wherein the playing simultaneously plays in synchrony the two different versions of the musical song.

15. A non-transitory computer-readable medium storing instructions which, when executed by a computer processor, causes the computer processor to perform a method, the method comprising:
receiving, by way of an input user interface of a media player, a selection of a play button;
playing simultaneously, by way of an output user interface of the media player, and in response to the selection, two different versions of a musical song including a first version and a second version of the musical song, the first version including only an instrumental component of the musical song, and the second version including only a vocal component of the musical song;
while the two different versions are being played simultaneously by way of the output user interface of the media player, receiving a volume adjustment by way of an adjustment of a volume control of the input user interface of the media player, the volume control being configured such that an adjustment of the volume control in a first direction increases a volume of a first of the two different versions being played by way of the output user interface of the media player and decreases a volume of a second of the two different versions being played by way of the output user interface of the media player, and such that an adjustment of the volume control in a second direction different from the first direction decreases the volume of the first of the two different versions being played by way of the output user interface of the media player and increases the volume of the second of the two different versions being played by way of the output user interface of the media player; and
in response to receiving the volume adjustment, increasing a volume of one of the two different versions being played by way of the output user interface of the media player and decreasing a volume of the other of the two different versions being played by way of the output user interface of the media player.

16. The non-transitory computer-readable medium of claim 15, wherein the two different versions of the musical song are two different versions of a same musical song.

17. The non-transitory computer-readable medium of claim 16,
wherein each of the two different versions is generated by isolating it from the same musical song; and
wherein each of the two different versions is isolated from the same musical song using a U-net neural network.

18. The non-transitory computer-readable medium of claim 15, wherein the increasing increases the volume of the one of the two different versions being played in inverse proportion to the volume of the other of the two different versions being played.

19. The non-transitory computer-readable medium of claim 15,
wherein the adjustment of the volume control includes a sliding of a slide bar; and
wherein the first direction is opposite the second direction.

20. The non-transitory computer-readable medium of claim 15, wherein the playing simultaneously plays in synchrony the two different versions of the musical song.

* * * * *